United States Patent [19]
Minh

[11] Patent Number: 5,982,046
[45] Date of Patent: Nov. 9, 1999

[54] WIND POWER PLANT WITH AN INTEGRATED ACCELERATION SYSTEM

[76] Inventor: Vu Xuan Minh, 28C Ngo 24 Tho Quan, Kham Thien, Dong Da, Hanoi, Viet Nam

[21] Appl. No.: 09/303,110

[22] Filed: Apr. 29, 1999

[51] Int. Cl.$^6$ .................................. F03D 9/00; H02P 9/04
[52] U.S. Cl. ................................. 290/55; 290/44; 415/2.1
[58] Field of Search ........................ 290/44, 55; 415/2.1, 415/4.2

[56] References Cited

U.S. PATENT DOCUMENTS

| | | | |
|---|---|---|---|
| 3,883,750 | 5/1975 | Uzzell | 290/55 |
| 3,944,840 | 3/1976 | Troll | 290/55 |
| 4,035,658 | 7/1977 | Diggs | 290/55 |
| 4,070,131 | 1/1978 | Yen | 415/3 |
| 4,079,264 | 3/1978 | Cohen | 290/55 |
| 4,164,382 | 8/1979 | Mysels | 415/2 |
| 4,411,588 | 10/1983 | Currah, Jr. | 415/2 A |
| 4,508,973 | 4/1985 | Payne | 290/55 |
| 5,447,412 | 9/1995 | Lamont | 415/4.2 |
| 5,457,346 | 10/1995 | Blumberg et al. | 290/55 |
| 5,478,197 | 12/1995 | Schatz et al. | 415/2.1 |
| 5,599,172 | 2/1997 | McCabe | 417/334 |
| 5,709,419 | 1/1998 | Roskey | 290/55 |

Primary Examiner—N. Ponomarenko

[57] ABSTRACT

A wind power plant comprises a wind acceleration system having an accelerating wind means for acceleration of an incoming prevailing wind and a plurality of turbine chambers each of which is a closable outlet passage of the accelerating wind means and closed-off by a controlled closing-off means. The accelerating wind means includes regulating means for modulating accelerated wind speeds in the acceleration system. Each turbine chamber is used for mounting a wind driven turbine which is operatively connected to an electric generator by a mechanical transmission means and an adapted gearing to convert mechanical energy into electrical energy. A wind direction sensor, a wind speed sensor and a control unit are provided for controlling the operation of the wind power plant. The control unit processes the data received from the wind sensors to selectively close-off the turbine chambers by controlling the closing-off means for optimizing energy production and to modulate the accelerated wind speeds in the acceleration system by controlling the regulating means for maintaining regular regimes of operation of the wind driven turbines in spite of any high prevailing natural wind speed. In the construction of the wind power plant any controllable (changeable or closable) opening can be divided into smaller controllable openings arranged at different altitudes and closed-off by controlled windows (windows, doors or shutters) which implement functions of the regulating means or closing-off means. Whereby the wind power plant can be constructed in any scale and will harness the wind resources intensively and effectively and operate normally at any high natural prevailing wind speed.

20 Claims, 11 Drawing Sheets

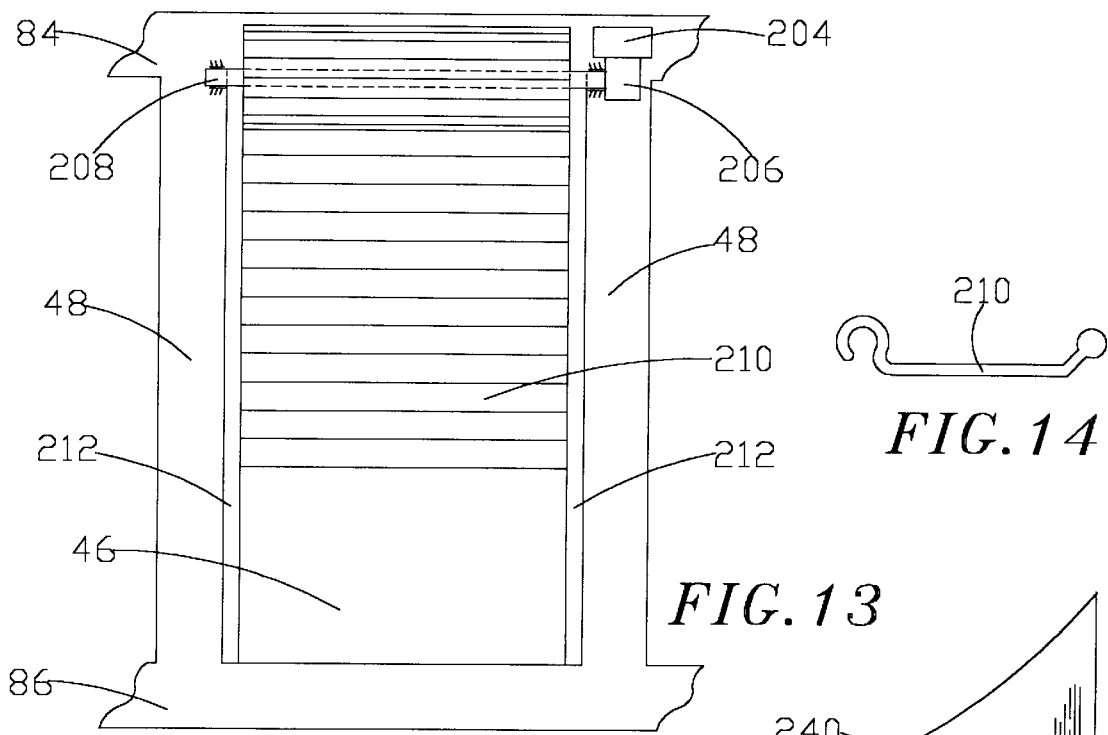
FIG. 13
FIG. 14
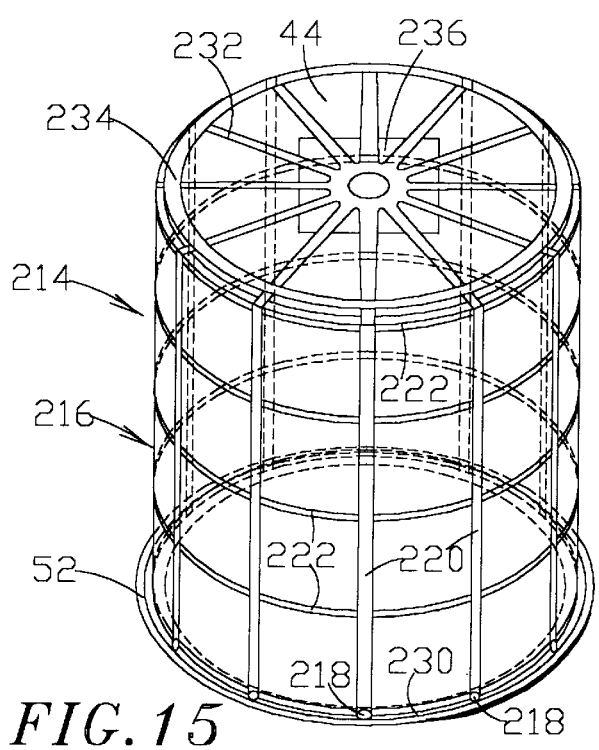
FIG. 15
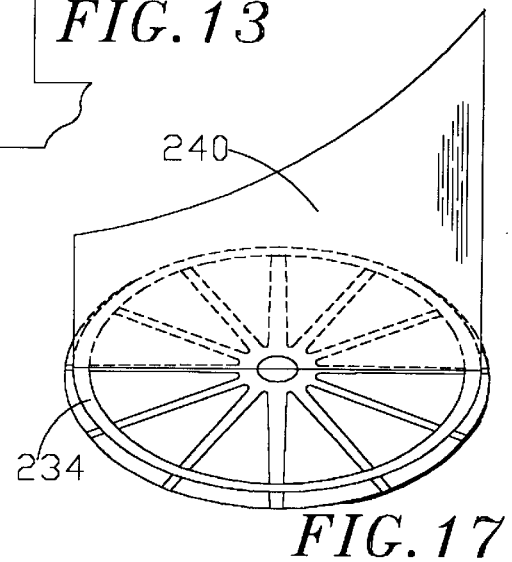
FIG. 17
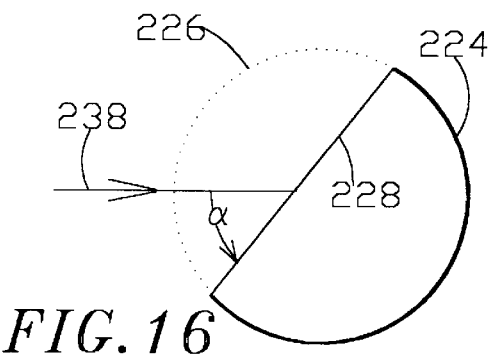
FIG. 16

WIND POWER PLANT WITH AN INTEGRATED ACCELERATION SYSTEM

FIELD OF THE INVENTION

The invention relates to wind energy technology and specifically to a novel type of wind power plant.

DISCUSSION OF THE PRIOR ART

Before the 1970s, wind energy development focused on individual turbines constructed on the principles of conventional windmills invented by mankind many thousands of years ago. From the 1970s rebirth of wind energy technology, two directions in improvement of the technology have been intensively developing. The first direction is the building of wind power plants each of which comprises arrays of conventional wind turbines. The largest wind power plants in the world have been built in California. The second direction is the construction of accelerating wind means for individual wind turbines as disclosed in U.S. Pat. Nos. 3,883,750 to Uzzel, May 13 1975; 3,944,840 to Troll, Mar. 16, 1976; 4,079,264 to Cohen, Mar. 14, 1978; 4,164,382 to Mysels, Aug. 14, 1979; 4,508,973 to Payne, Apr. 2, 1985; 5,447,412 to Lamont, Sep. 5, 1995; 5,458,347 to Blumberg and Wells, Oct. 10, 1995; and 5,599,172 to McCabe, Feb. 4, 1997.

It is known for those skilled in the art that the main drawbacks of the wind power plants repeat the disadvantages of conventional wind turbines. They are a lower efficiency, the massy bulk of rotors, the erratic regime of wind speeds for rotors, and the problem of excessive wind speeds, the solution of which demands using brakes for rotors at sufficiently high wind speeds and stopping the work of the turbines at such called survival wind speeds.

The disclosed accelerating wind means were directed on increasing the efficiency and decreasing the size of rotors. However, in most accelerators, such as in U.S. Pat. Nos. 3,833,750; 4,079,264; 4,164,382; 5,447,412; 5,457,346; and 5,599,172 the use of a structure supporting rotation of the accelerators limits the scale of the accelerators and the massy bulk of the supported for rotation accelerators substitutes for the massy bulk of rotors. The use of a movable vane for creating ratio-variable entrance and exit openings in U.S. Pat. No. 3,944,840 cannot remove the drawbacks because of the massy bulk of the movable vane. Prior U.S. Pat. No. 4,508,973 disclosed an accelerator including a stationary circular arrangement of segmental wind inlet passages extending around a vertical axis and having vertical inlet openings at the outer ends, the inlet opening having inwardly and upwardly curving walls extending from the inlet openings toward the central axis to form constricted upwardly directed passages that merge into a Venturi throat in which a bladed impeller is mounted. The main disadvantage of the accelerator is the complexity of its construction. Except for the aforesaid drawbacks of the suggested accelerators in the prior art patents the problems of the erratic regime of wind speeds and excessive wind speeds become much more serious than in the technology of conventional wind turbines because of the acceleration of wind speeds. For the reasons the suggested prior art devices of the second direction are not economically feasible.

OBJECTS AND ADVANTAGES

Accordingly, the main objects and advantages of my invention are to provide highly efficient wind power plants of any scale which have simple acceleration systems, maintain regular (limiting or steady) regimes of wind speeds for the rotors of wind driven turbines and operate normally at any high prevailing natural wind speed, i.e. excluding the problems of the erratic regime of wind speeds and excessive wind speeds for the rotors.

The above and another objects, advantages and features of my invention will become apparent following examination of the drawings and ensuing description herein:

BRIEF DESCRIPTION OF THE DRAWINGS

FIG. 13 is a front schematic view of a controlled rolling shutter adapted to be a controlled window of the wind power plant of FIG. 1.

FIG. 14 is an exemplary sectional configuration of a sheet used in the structure of the rolling shutter shown in FIG. 13.

FIG. 15 is a schematic perspective view of a controlled rotatable window of the wind power plant of FIG. 1.

FIG. 16 is a diagrammatic view of a relative position of the wind direction to the controlled rotatable window shown in FIG. 15.

FIG. 17 is a drive vane of a flywheel of the rotatable window of FIG. 15.

Figure 1:
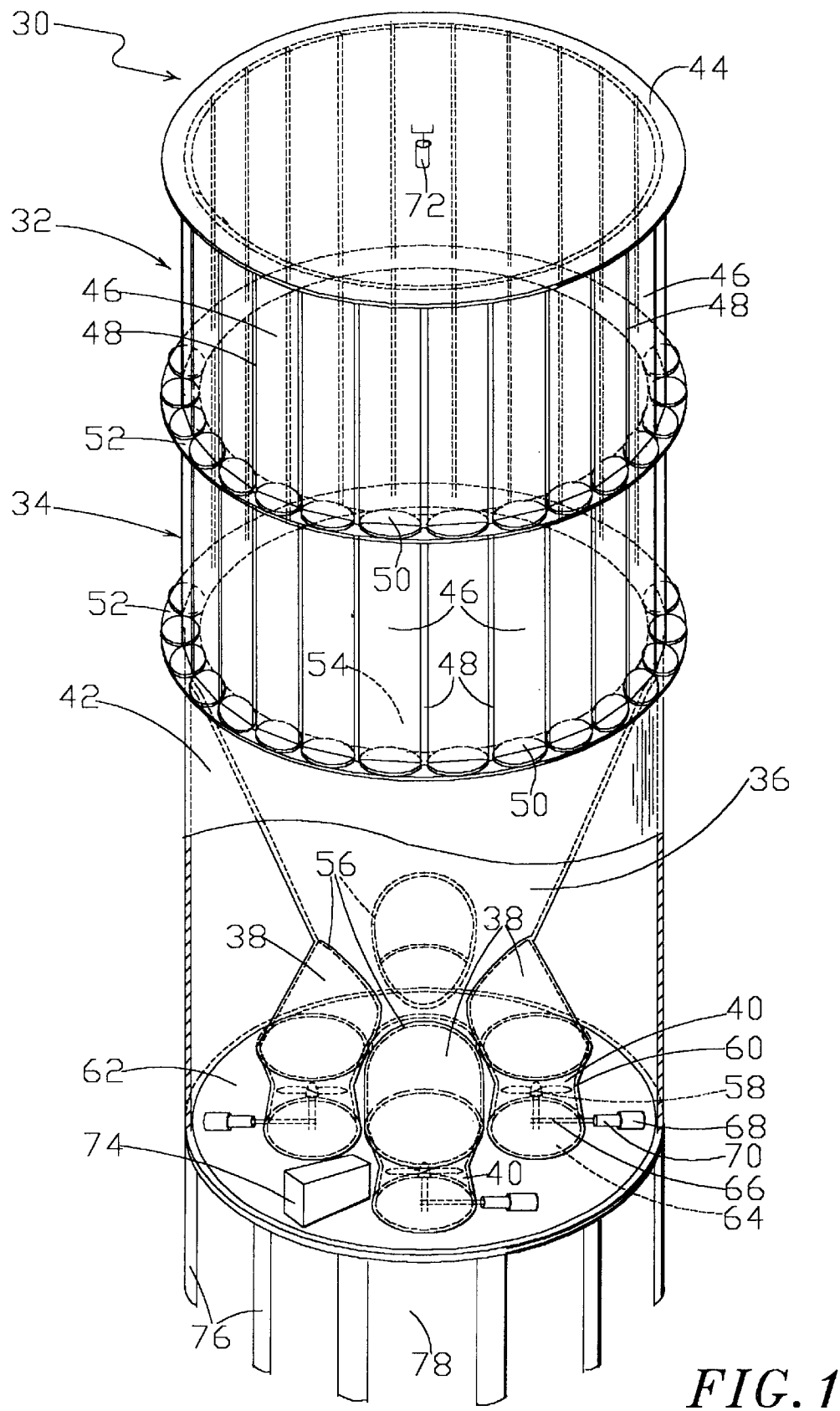
FIG. 1 is a schematic perspective view of a wind power plant embodying the present invention with a lower wall fragment of its tower removed to show the arrangement of turbine chambers.

REFERENCE NUMERALS IN DRAWINGS 30 wind power plant
32 accelerating wind means
34 collection chamber
36 acceleration chamber
38 parting passage
40 turbine chamber
42 tower
44 roof
46 closable window opening
48 post
50 controlled revolving window
52 mounting platform
54 inlet opening
56 outlet opening
58 wind driven turbine
60 throat of turbine chamber
62 turbine platform
64 closable outlet opening
66 mechanical transmission means
68 electric generator
70 gear box
72 wind sensor set
74 control unit
76 pier of tower
78 exhaust-space
80 strengthening band
82 upper window support
84 beam
86 beam
88 turntable
90 bearing
92 window shaft
94 gearwheel
96 gearwheel
98 gear train
100 motor
102 hoop
104 drive chain
106 hydraulic piston
108 cable
110 groove
112 post
114 transverse strut means
116 seam
118 seam
120 bolt
122 flange
124 inner peripheral support
126 bolt
128 turbine shaft
130 bore
132 bore
134 rod
136 rod
138 controlled sliding door
140 bottom surface
142 guide track
144 rail
146 hydraulic piston
148 middle bar
149 subsystem of optimal control
150 transmission line
151 subsystem of automatic control
152 calculator
154 transmission line
156 transmission line
158 optimizer
160 identifying means
162 transmission line
164 controller of motors
166 transmission line
168 motors
170 wind speed sensors
172 transmission line
174 transmission line
176 transmission line
178 summing means
180 fed back line
182 output side
184 minimizing means
186 input
188 transmission line
190 transmission line
192 input
194 controller of motors
196 transmission line
198 wind speed sensors
200 transmission line
202 average calculator
204 motor
206 gearing
208 roller
210 metal sheet of rolling shutter
212 track
214 controlled rotatable window
216 cylindrical frame
218 roller
220 vertical metal rod
222 horizontal metal ring
224 closed part of rotatable window
226 open part of rotatable window
228 end plane of inlet opening
230 guide channel
232 spoke
234 controlled flywheel
236 motor
238 wind direction
240 vane
242 sucking means
244 roof
246 outer periphery
248 wall
250 wind power plant
252 accelerating wind means
254 acceleration passage
256 central multistory turbine house
258 base
260 roof
262 side wall
264 regulated exhaust-opening
266 outer vertical edge
268 inlet opening
270 inner vertical edge
272 integrated inlet opening
274 integrated exhaust-opening
276 exhaust-passage
278 frame
280 controlled exhaust-door
282 shaft of exhaust-door
284 roller
286 circular guide channel
288 hydraulic piston
290 floor
292 turbine chamber
294 wind driven turbine
296 vertical support
298 electric generator
300 mechanical transmission means
302 gear box
304 impeller
306 control unit
308 wind sensor set
310 blade of Darrieus turbine
312 shaft of Darrieus turbine
314 mechanical transmission means
316 supporter of shaft end
317 subsystem of optimal control
318 transmission line
319 subsystem of automatic control
320 calculator
322 transmission line
324 transmission line
326 optimizer
328 identifying means
330 transmission line
332 controller of motors
334 motors
336 windows of turbine chamber
338 wind speed sensors
340 transmission line
342 calculator
344 transmission line
346 transmission line
348 summing means
350 transmission line
352 input side
354 output side
356 minimizing means
358 input
360 transmission line
362 transmission line
364 transmission line
366 controller of motors
368 transmission line
370 wind power plant
372 central collection chamber
374 turbine story
376 closable inlet opening
378 wall of collection chamber
380 wall of turbine story
382 turbine chamber
384 floor of turbine story
386 roof of turbine story
388 inlet opening of turbine chamber
390 closable outlet opening
392 wind driven turbine

SUMMARY OF THE PRINCIPLES OF THE INVENTION

In the present invention alternative wind power plants with an integrated acceleration system are constructed to exploit effectively an aerodynamic relationship, which states that the ratio of the kinetic energy of accelerated wind passing through the flow area at a cross-section of an air duct to the kinetic energy of the natural wind entering into the inlet opening of the air duct is the square of the ratio of their corresponding wind speeds. The ratio is obtained by direct application of the known formula for kinetic energy, which is equal to half of the mass multiplied by the square of the wind speed, and the law of conservation of mass, in accordance with that the mass of the air entering into the inlet opening is equal to the mass of the air passing through the cross-section. For example, if the natural wind speed is accelerated ten times then the kinetic energy of the accelerated wind increases one hundred times. The increased kinetic energy at the cross-section results from the drop in pressure of the air flow at the cross-section complying with the law of conservation of energy for fluid flows. Therefore each wind accelerator (or converging air duct) is a means for transforming a part of the pressure of the air flow passing therethrough into an amount of kinetic energy added to the kinetic energy of the natural wind, and the higher the acceleration coefficient the more effective the wind power plant.

An integrated acceleration system in accordance with the present invention comprises, in combination, an accelerating wind means for acceleration of an incoming prevailing wind and a plurality of closable turbine chambers each of which being closable outlet passage of the accelerating wind means. The turbine chambers are selectively closed-off by controlled closing-off means which depend on the prevailing wind speed to give such a structural state of the integrated acceleration system that the total energy produced by wind driven turbines positioned in the turbine chambers gets most effective value or substantially maximized. The wind speeds in the turbine chambers are controlled and maintained at regular (limiting or steady) values by regulating means. Whereby a wind power plant with the integrated acceleration system will harness the wind most effectively and operate normally at any high prevailing natural wind speed without the problems of the erratic regime of wind speeds and excessive wind speeds.

In accordance with the present invention any controllable (changeable or closable) opening can be divided into smaller controllable openings arranged at different altitudes which are called window openings and closed-off by controlled windows (windows, doors or shutters). The controlled windows implement functions of the regulating means or closing-off means. The method of division of a controllable opening into window openings allows the building of wind power plants with an integrated acceleration system as large as desirable and, accordingly, with higher acceleration coefficients.

Whereby wind power plants with an integrated acceleration system in accordance with the aforesaid principles of the present invention can be constructed in any scale and will harness the wind resources intensively and effectively and operate normally at any high prevailing natural wind speeds.

The principles of the present invention will be realized in detail in the preferred embodiments described below.

DESCRIPTION OF THE PREFERRED EMBODIMENTS

Referring now to the drawings, a wind power plant constructed in accordance with one embodiment of the present invention is indicated generally at 30 in FIG. 1. Wind power plant 30 includes a vertical integrated acceleration system, which comprises an accelerating wind means, indicated generally at 32, and a plurality of turbine chambers 40 (see also FIG. 2). Accelerating wind means 32 comprises a collection chamber, indicated generally at 34, an acceleration chamber 36, and a plurality of parting passages 38. Collection chamber 34 is fixed on the top of a tower 42 and includes a roof 44 and a plurality of closable window openings 46 arranged in circular arrays extending circumferentially about the periphery of the collection chamber at different altitudes. There are two arrays of closable window openings 46 shown in FIG. 1. Posts 48 extending from the wall of tower 42 define vertical sides of window openings 46. Controlled revolving windows 50 are provided for selectively closing-off window openings 46. A mounting platform 52 is provided for installation of the mechanisms of each array of windows 50. Acceleration chamber 36 is a converging downward air duct, which may be formed in a frusto-conical configuration as shown in FIG. 1. Turbine chambers 40 are Venturi-shaped. There are five turbine chambers shown in FIGS. 1 and 2. Parting passages 38 are air ducts adapted to direct air flow from acceleration chamber 36 to respective turbine chambers 40. Acceleration chamber 36 has an inlet opening 54, which simultaneously is a stationary outlet opening of collection chamber 34, and a plurality of outlet openings 56, which simultaneously are inlet openings of parting passages 38. Wind driven turbines 58 are positioned at throats 60 of turbine chambers 40. A turbine platform 62 is provided for mounting turbine chambers 40 and turbines 58. Each turbine chamber 40 has a closable outlet opening 64 (see also FIGS. 10 and 11), which is a hole on turbine platform 62. A mechanical transmission means 66 is provided for operative connection of wind driven turbine 58 to an electric generator 68 with an adapted conventional gear box 70. A wind sensor set 72 may be positioned on roof 44 for providing data of wind direction and speed to a control unit 74 which may be situated on turbine platform 62 or in any suitable place. In snowy areas the wind sensor set must be placed in adapted place to avoid snow cover. Other wind speed sensors (not shown) may be also positioned in the chambers, particularly in the inlet opening of acceleration chamber 36 and turbine chambers 40 for providing information of accelerated wind speeds to control unit 74. Tower 42 has bottom piers 76 creating an exhaust-space 78 for turbine chambers 40. Generally, control unit 74 includes a plurality of elements which may be either assembled in one block as shown in FIG. 1 or dispersed in different places.

Figure 2:
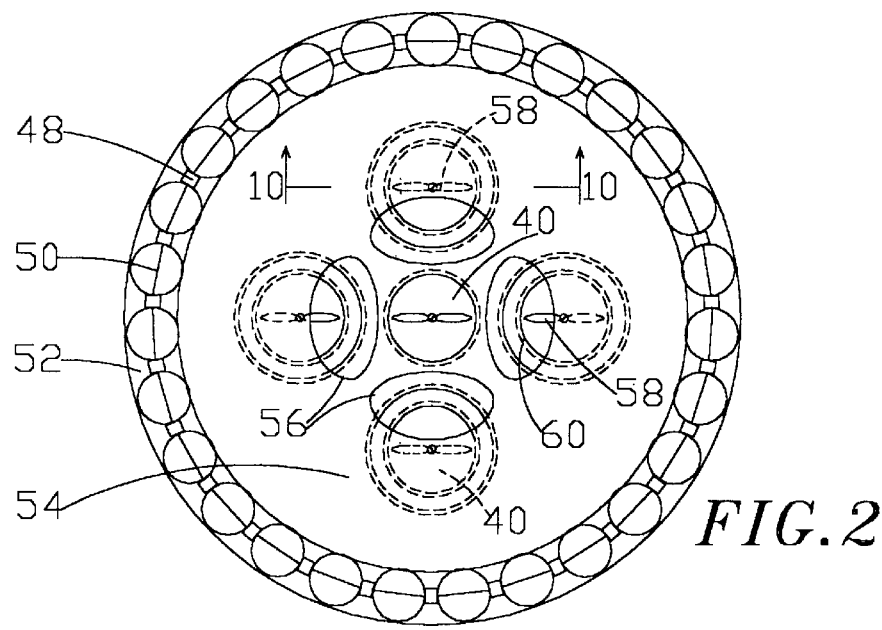
FIG. 2 is a top plan view of the wind power plant of FIG. 1 shown with its roof removed.
Figure 3:
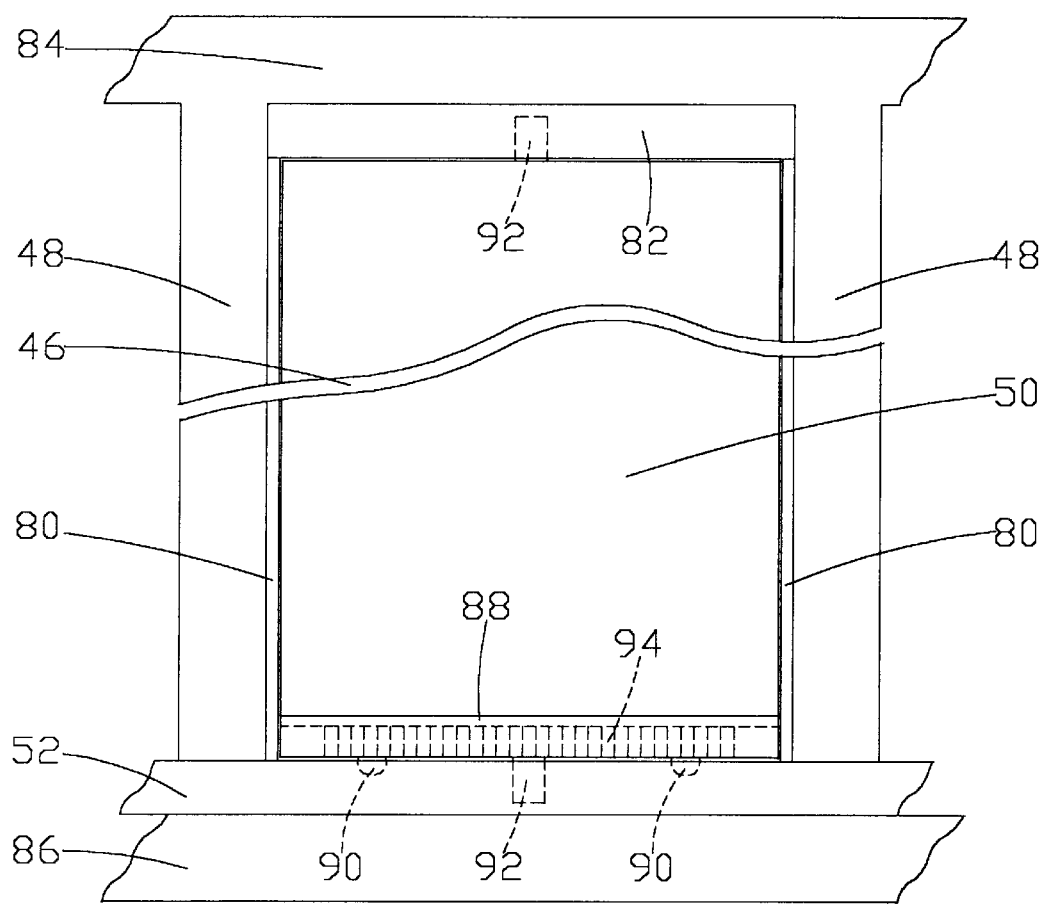
FIG. 3 is a front schematic view, partially broken away, of a structure of one controlled revolving window of the wind power plant of FIG. 1.
Figure 4:
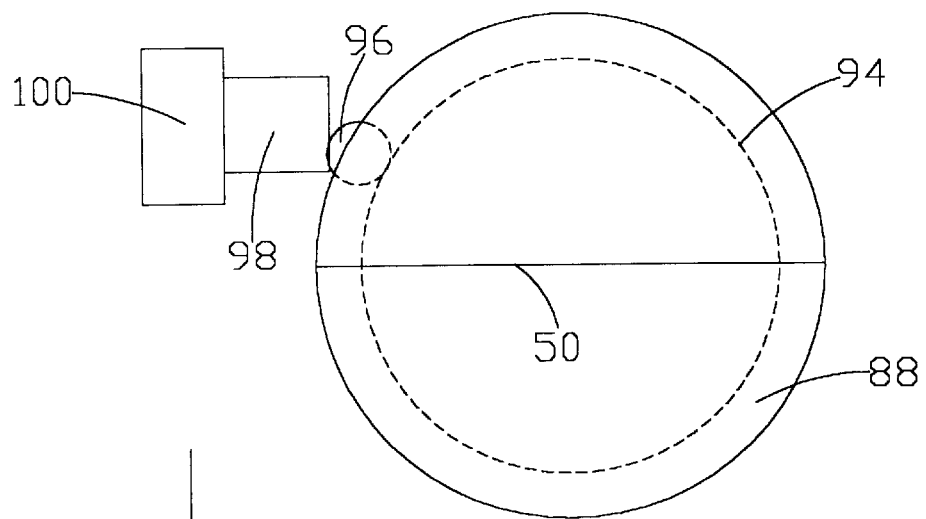
FIG. 4 is a top schematic view of the controlled revolving window of FIG. 3 shown together with a control motor and a gear train.
Figure 5:
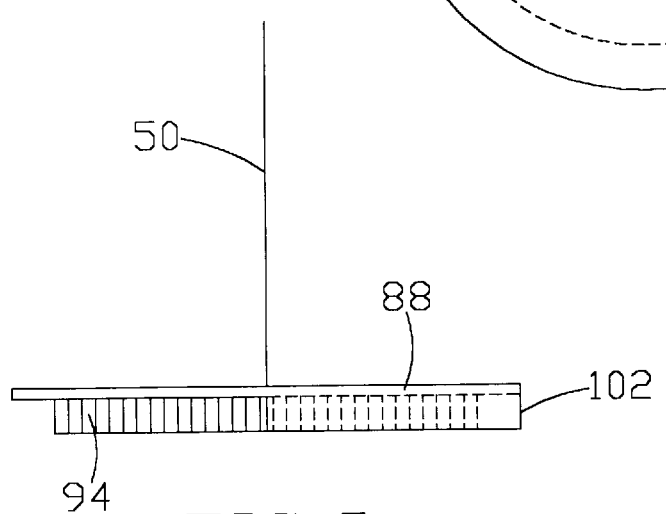
FIG. 5 is a side schematic view of the controlled revolving window of FIG. 3.
Figure 6:
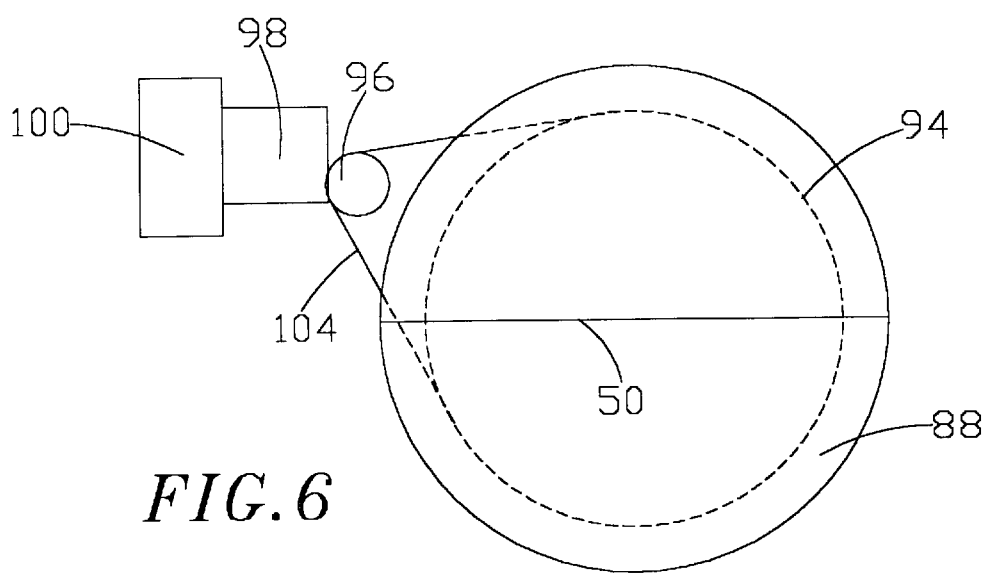
FIG. 6 is a top schematic view of the controlled revolving window of FIG. 3 shown together with a control motor and a drive chain.
Figure 7:
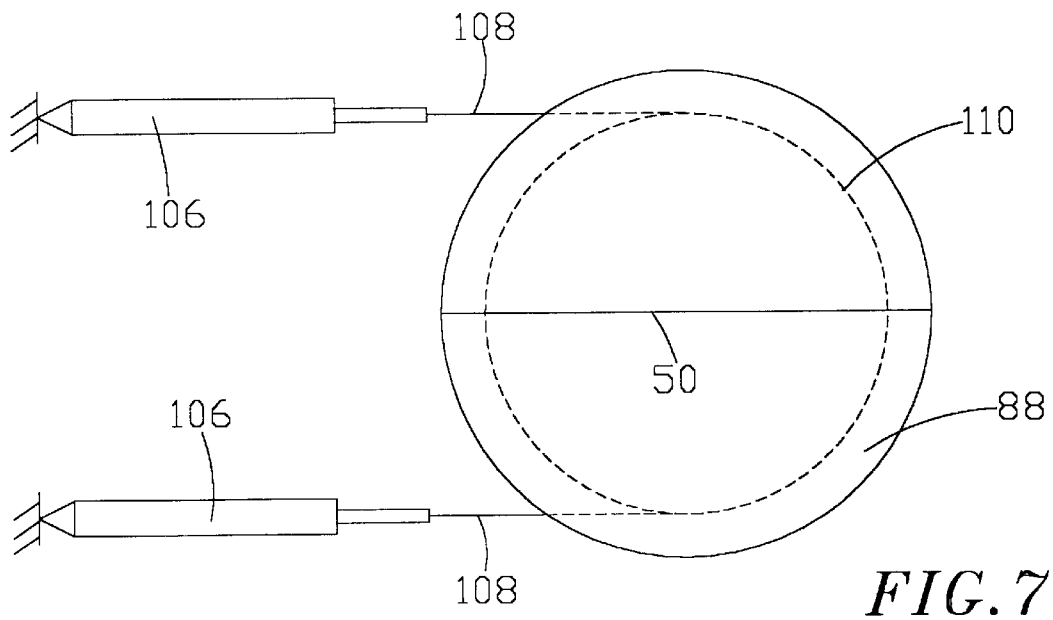
FIG. 7 is a top schematic view of the controlled revolving window of FIG. 3 shown together with hydraulic pistons.

Roof 44 may be constructed of concrete, sheet metal, plastic material, composite material, or any other suitable conventional material. In FIG. 1, roof 44 has a flat circular shape. However, the roof may have any suitable form. In particular the roof may have slopes for decreasing snow cover and stagnant water. Roof 44 is supported on beams (not shown) connecting the upper ends of posts, some of which are posts 48 extending from the wall of tower 42. Other posts (not shown) and beams (not shown) are added as required to support the roof.

collection chamber 34 in FIG. 1 comprises two circular arrays of closable window openings 46. However, the chamber may comprise one or many arrays of closable window openings depending on the scale of wind power plant 30 and the size of controlled windows used for closing-off the closable window openings. In wind power plant 30, presented in FIG. 1, controlled revolving windows 50 are used for construction of collection chamber 34. At each instant a part of windows 50 being in opened position creates an inlet opening of collection chamber 34, while the remaining part of windows 50 being in closed position creates a wall to direct the incoming wind downward into inlet opening 54 of acceleration chamber 36. A structure of an assembly of controlled revolving window 50 for closing-off window opening 46 is shown in FIG. 3. Each window opening 46 is bounded on the vertical sides by strengthening bands 80 secured on two consecutive posts 48, on the top by an upper window support 82 secured on the lower plane of a beam 84 connecting the posts 48, and on the bottom by mounting platform 52 secured on the upper plane of a lower beam 86 connecting the same posts 48. All the platforms of windows 50 of each array are secured together to create integral annular mounting platform 52 as shown in FIGS. 1 and 2. The width of platform 52 is sufficiently large for installation of the mechanisms of controlled revolving windows 50. Strengthening bands 80 may also be secured with upper support 82 and platform 52 for enforcing the structures. Platform 52, upper support 82 and bands 80 are preferably made of metal materials. Window 50 is secured on a turntable 88 which is supported on suitable bearings 90 for rotation in a substantially horizontal plane on a fixed window shaft 92. Suitable sleeve bearings (not shown) may be provided in the bores of shaft 92. Window 50 may be made of sheets of metal, composite or any unbreakable material with a frame or struts (not shown) for strengthening the structure. Turntable 88 has a gearwheel 94 underneath (see also FIG. 4) which is driven for rotation by a small gearwheel 96 of a gear train 98 driven by a control motor 100. Turntable 88 may have a half-circle downward hoop 102 positioned in such a half periphery of the turntable that hoop 102 shields the half of gearwheel 94 facing outwardly when window 50 is in closed position (see FIG. 5). The mechanical transmission from gear train 98 to gearwheel 94 may be also implemented by means of a drive chain 104 (see FIG. 6). Turntable 88 may be also driven by hydraulic pistons 106 (see FIG. 7). In FIG. 7 hydraulic pistons 106 rotate turntable 88 by pulling a cable 108 rolling a groove 110 located underneath turntable 88.

Figure 8:
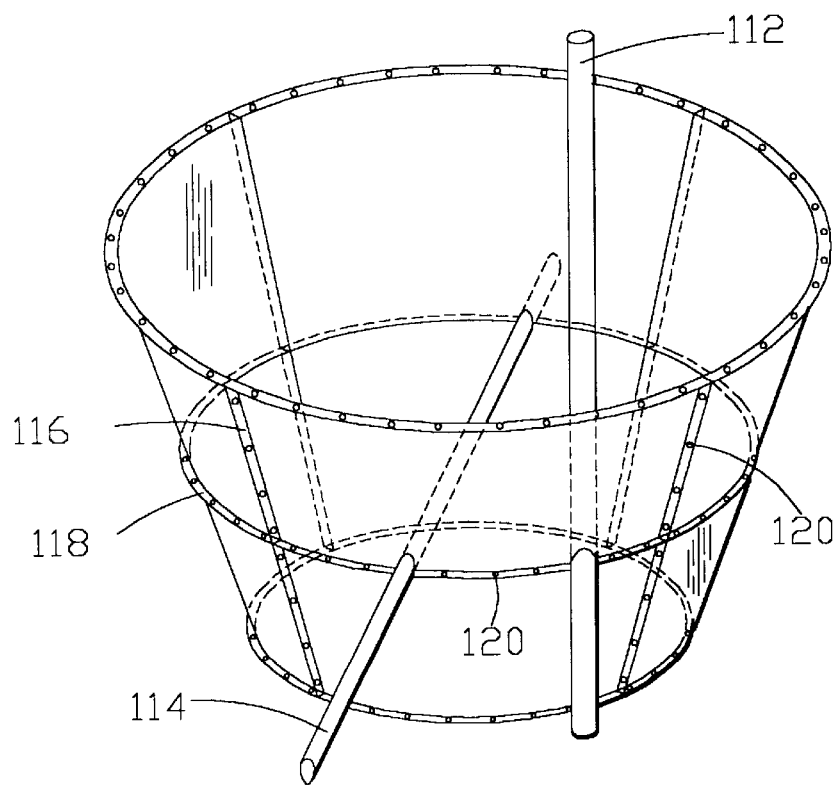
FIG. 8 illustrates schematically securing two adjacent segmented sections of an acceleration chamber of the wind power plant of FIG. 1.

Acceleration chamber 36 may be fashioned from sheet metal, plastic material, composite material, or any suitable conventional engineering material. Acceleration chamber 36 may be made either as an integral unit or from a number of sections secured together by bolts or otherwise for facilitation of transport, installation, replacement and maintenance work. For large wind power plant 30 the acceleration chamber is inevitably constructed from a number of sections, because except for piers 76 and posts 48 additional posts or columns and beams or other transverse strut means may be necessary to be built for supporting the roof and the chambers of wind power plant 30. In such circumstances it is preferable to construct acceleration chamber 36 from a number of sections and each section in turn is preferably constructed from a number of segments secured together. In this assembly structure the segments must be configured so that the posts (or columns) or beams (or other transverse strut means) intersect the wall of acceleration chamber 36 at seams only. FIG. 8 illustrates an exemplary structure of two such sections intersected by a post 112 and a transverse strut means 114. Each section is constructed of six segments. Two segments of each section are secured together at a seam 116. The two sections are secured together at a seam 118. Bolts 120 are used for securing the segments and sections. From an aerodynamic viewpoint the best cross-section of the transverse strut means in the acceleration chamber should be airfoil-shaped. It is apparent that the assembly structure of the acceleration chamber is easily transported, assembled, maintained and substituted.

Figure 9:
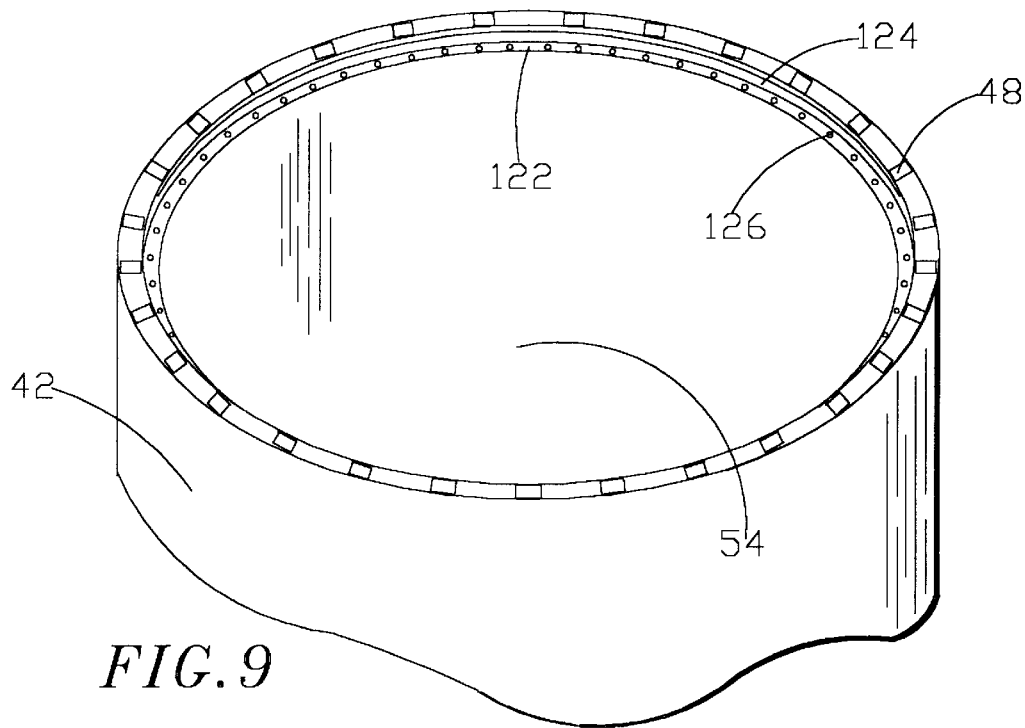
FIG. 9 illustrates schematically securing the upper end of the acceleration chamber with the sections shown in FIG. 8 to the top of a tower supporting the wind power plant of FIG. 1.

The upper end of acceleration chamber 36 forming inlet opening 54 is secured on an inwardly-extending lower annular flange 122 of an upstanding inner peripheral support 124 constructed on the inner wall of tower 42 closer to the top of the tower (see FIG. 9) by bolts 126 or otherwise.

Parting passages 38 and turbine chambers 40 are fashioned and secured by the same way as acceleration chamber 36 is. They are also preferable constructed from a number of sections and segments taking supporting means into account. Each parting passage 38 is connected to acceleration chamber 36 and corresponding turbine chamber 40 at their respective seams by bolts or otherwise.

Figure 10:
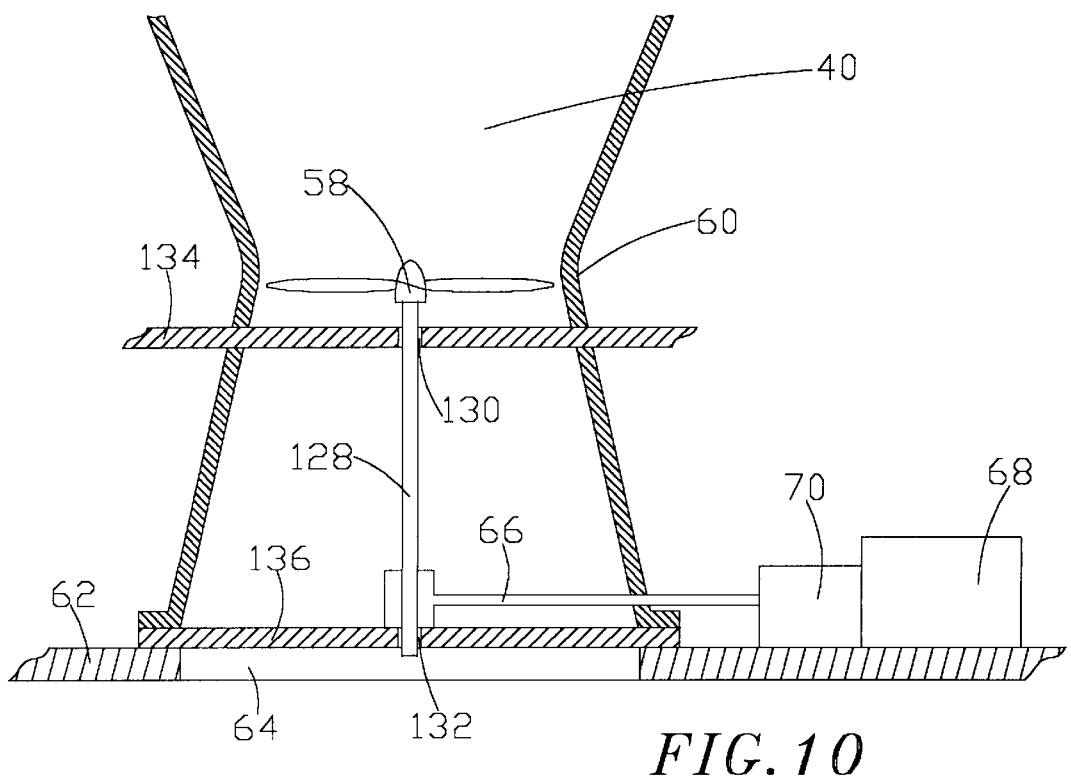
FIG. 10 is an enlarged schematic sectional view of one turbine chamber of the wind power plant of FIG. 1 taken on line 10—10 of FIG. 2.

FIG. 10 shows an exemplary cross-sectional view of one turbine chamber 40. Wind driven turbine 58 may take any one of a number of know design configurations suitable for use as a wind driven turbine. In FIG. 10 turbine 58 is supported for rotation together with an associated turbine shaft 128 on a substantially horizontal plane. Turbine shaft 128 extends downwardly through suitable bores 130 and 132 in an upper turbine support rod 134 and a lower turbine support rod 136 respectively. The posts supporting support rod 134 are not shown. Lower support rod 136 may be mounted on turbine platform 62. Suitable sleeve bearings (not shown) may be provided in bores 130 and 132 to provide bearing support for turbine shaft 128. Mechanical transmission means 66 transferring rotation of shaft 128 to gear box 70 may be a drive shaft, a link chain, a driving belt, a gear train, etc. In FIGS. 1 and 10 generator 68 and gear box 70 are positioned on platform 62 outside of turbine chamber 40. Such an arrangement is more preferred since both generator 68 and gear box 70 do not obstruct the air flow in the turbine chamber. However, the generator may be also positioned directly in turbine chamber 40 with an adapted gear train operatively connected with shaft 128.

Figure 11:
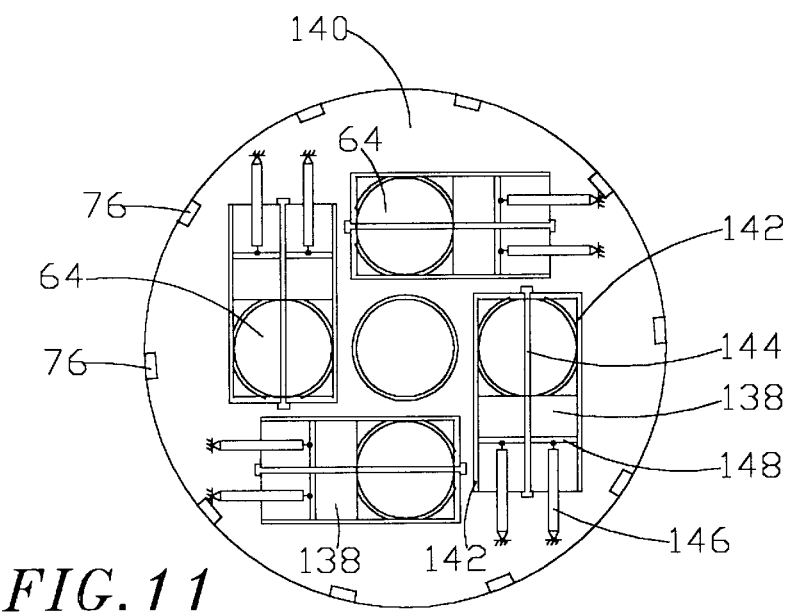
FIG. 11 is a schematic plan view of controlled sliding doors for selectively closing-off the outlet openings of the turbine chambers of the wind power plant of FIG. 1.

Controlled sliding doors 138 presented in FIG. 11 are mounted under the bottom surface 140 of turbine platform 62 for selectively closing-off outlet openings 64 of turbine chambers 40. In this figure the central outlet opening has no door and is always opened. Doors 138 may be fashioned from sheet metal or any other suitable materials. Each door 138 is operatively supported in two side guide tracks 142 and on a rail 144 in the middle. Door 138 has rollers (not shown) for moving on rail 144. Suitable bearings (not shown) may be provided in guide tracks 142 to facilitate sliding door 138 along tracks 142. Door 138 is driven by hydraulic pistons 146 of a control hydraulic engine (not shown). The outer ends of pistons 146 are connected to a middle bar 148 of door 138. In FIG. 11 doors 138 are driven by hydraulic engines. However, doors 138 may be also driven by control electric motors with adapted gear trains.

In FIG. 1 tower 42 has a cylindrical wall and is supported on piers 76. Tower 42 may be constructed from conventional building materials. Tower 42 has posts 48 extensions to which support collection chamber 34. Turbine platform 62 may be also constructed from conventional building materials together with tower 42. For sufficiently large wind power plant 30 piers 76 may not be satisfied to support platform 62, roof 44 and the chambers or air ducts of the wind power plant. In such circumstances additional posts or columns (not shown) and beams or other transverse strut means (not shown) must be constructed as many as required to support platform 62, roof 44, the chambers or air ducts and all the other means provided in wind power plant 30. The aforesaid structure of tower 42 is preferable since the tower creates a protective wall for acceleration chamber 36, parting passages 38, turbine chambers 40, control unit 74, generators 68 and other means positioned on turbine platform 62. The use of the structure of tower 42 allows to construct the chambers and passages of the wind power plant from light and cheap materials since the demand for strength of the materials is lower. In construction of tower 42 a system of ladders (not shown) may be provided for the works of installation, maintenance, substitution, research and exploitation. Although the structure of tower 42 presented in FIG. 1 is preferable, other suitable towers may be also used for supporting the acceleration system of wind power plant 30 in accordance with the principles of the present invention. However, if a tower does not provide a protecting wall for the acceleration system the demand for strength of construction materials of the acceleration system is higher and the equipment positioned outer the acceleration system must be shielded from weather effects.

Control unit 74 is provided for controlling the process of selective closing-off turbine chambers 40 and windows 50 to satisfy desirable (optimal) criteria of energy production in the condition of maintaining regular regimes of operation of wind driven turbines 58. The desirable (optimal) criteria are optional from the purposes of the most effective harnessing the wind and using the equipment of wind power plant 30.

The most desirable criteria may be the maximum energy production and the maximum sensitivity to the incoming wind speed, which means the minimum value of the incoming wind speed at which the wind power plant begins to generate electricity. The most desirable regular regimes may be either a limiting regime of wind speeds, in which wind speeds are controlled to be not greater than a predetermined wind speed limit, or a steady regime, in which wind speeds are maintained about a predetermined wind speed. The option of the regular regimes depends on the characteristics of used turbines 58, mechanical transmission means 66, gearboxes 70 and electric generators 68.

Figure 12:
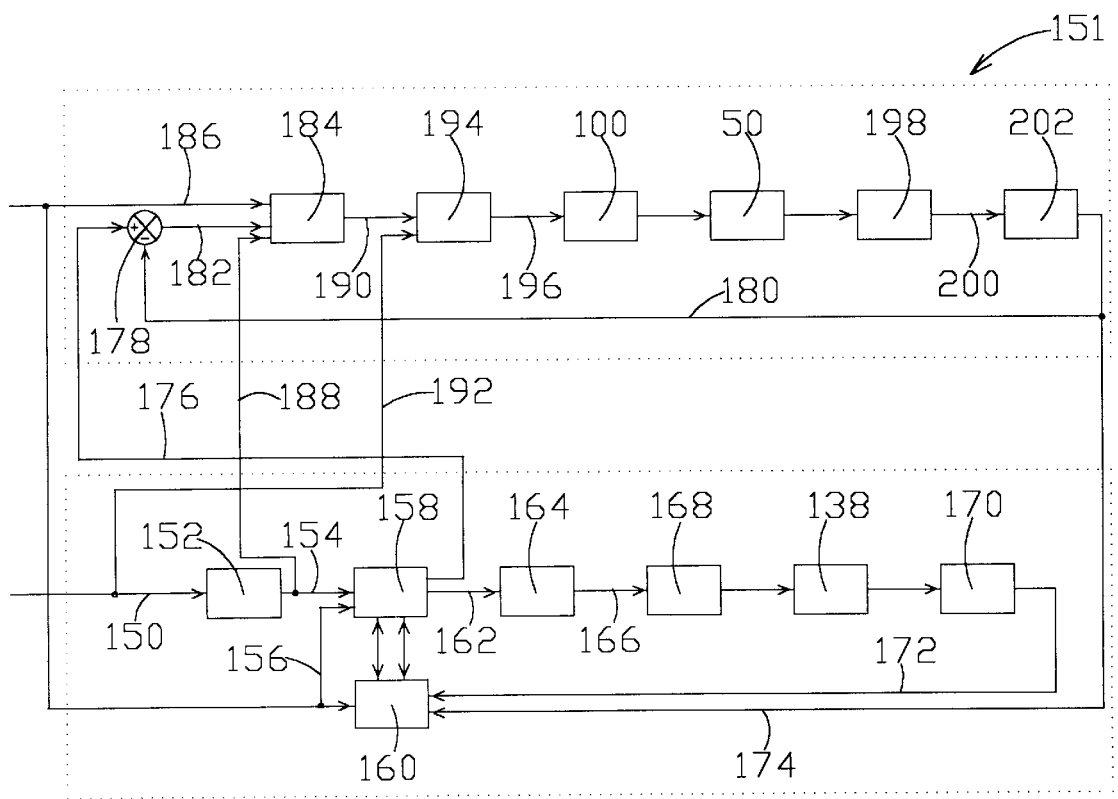
FIG. 12 illustrates a simplified diagram of a control system of the wind power plant of FIG. 1.

Control unit 74 is connected with the sensors and control motors of wind power plant 30 by electrical lead wires (not shown) or radio waves. FIG. 12 illustrates a simplified diagrammatic representation of an exemplary control system defining the work of control unit 74. The control system may be divided into a subsystem of optimal control, bounded by a closed dot line and indicated generally at 149, and a subsystem of automatic control, bounded by a closed dot line and indicated generally at 51. The function of subsystem of optimal control 149 is the selection of states (open or closed) for turbine chambers 40 to optimize energy production in accordance with the desirable criteria. The function of subsystem of automatic control 151 is the maintenance of the regular regimes of operation of wind driven turbines 58 positioned in the opened turbine chambers 40.

In operation, wind power plant 30 is governed by control unit 74.

Consider now subsystem of optimal control 149. The current wind direction is sent along a line 150 to a calculator 152 at which the current wind capture areas of window openings 46 facing into the wind are defined. The current wind capture area of each windwardly facing window opening 46 is equal to its area multiplied by cosine of the angle between the wind direction and the perpendicular of the plane of the window opening. The current wind capture area of each downwind facing window opening 46 is equal to zero. An identifying means 160 identifies acceleration coefficients of acceleration chamber 36 at different wind speeds taking air viscosity into account by a statistical method or an adaptive method. A simple exemplary statistical method used in identifying means 160 is taking the average acceleration coefficient on the base of the observed data. An optimizer 158 receiving the acceleration coefficients in communication with identifying means 160, the information of the current wind capture areas sent along a line 154 and the current natural wind speed sent along a line 156 selects states (open or closed) for turbine chambers 40 to optimize energy production of wind power plant 30. The selected states of turbine chambers 40 define a selected structural state of wind power plant 30. A controller 164 receiving the information of the selected states of turbine chambers 40 (or the selected structural state of wind power plant 30) translated along a line 162 generates control commands which are sent along a line 166 to motors 168 (not shown in FIG. 11) of hydraulic engines having pistons 146 driving sliding doors 138 of turbine chambers 40. The position of door 138 of outlet openings 64 of turbine chambers 40 impinges on the current accelerated wind speeds in the turbine chambers. Wind speed sensors 170 (not shown in FIG. 10) measure the accelerated wind speeds in turbine chambers 40 and transmit the information of the current accelerated wind speeds along a line 172 to identifying means 160. Identifying means 160 processing the information of accelerated wind speeds in turbine chambers 40 and the average wind speed at inlet opening 54 of acceleration chamber 36 received on a line 174 identifies the acceleration coefficients of acceleration chamber 36 which are the ratios of accelerated wind speeds in turbine chambers 40 to the average wind speed at inlet opening 54 of acceleration chamber 36 for different states (open or closed) of closable outlet openings 64 of the turbine chambers. Optimizer 158 exchanges the information of the acceleration coefficients of acceleration chamber 36 with identifying means 160 in determining the states of turbine chambers 40. Identifying means 160 is needed for receiving the acceleration coefficients with higher accuracy since they depend not only on the areas of cross-sections of the chambers, but also on the speeds of air flows passing therethrough because of the air viscosity. However, if the air viscosity is neglected, the acceleration coefficients may be considered independent from speeds and approximately calculated as the ratios of the area of the plane of inlet opening 54 of acceleration chamber 36 to the sum of the areas of the cross-sections at the throats of the opened turbine chambers 40 of each selected structural state of wind power plant 30. With the aforesaid adoption identifying means 160 and speed sensors 170 in turbine chambers 40 may be removed.

Subsystem of automatic control 151 maintains a limiting regime (or steady regime) of operation of wind driven turbines 58. The limiting regime of operation means that the accelerated wind speed in each turbine chamber 40 can not exceed a desirable predetermined wind speed limit which may be the nominal wind speed or rated wind speed of turbine 58 or some reasonable wind speed, for example, a speed slightly greater than the nominal wind speed. The wind speed limits in turbine chambers 40 determine the wind speed limit at inlet opening 54 for each selected structural state of wind power plant 30. The wind speed limit at inlet opening 54 of each selected structural state, defined by optimizer 158, is transmitted along a line 176 to a summing means 178. The actual average wind speed, defined by averaging over the cross-section, at inlet opening 54 is fed back along a line 180. The difference between the speed limit and the actual average wind speed is resulted at an output side 182 of summing means 178 and translated to a minimizing means 184. Minimizing means 184 using the information of the current natural wind speed at an input 186 and the wind capture areas of window openings 46 transmitted from calculator 152 along a line 188 selects states (open or closed) for window openings 46 facing to the wind to minimize the difference between the speed limit and the actual average wind speed at inlet opening 54 of acceleration chamber 36. The closed state is always selected for all the downwind facing window openings 46 to direct the incoming wind toward inlet opening 54 of acceleration chamber 36. The selected states of window openings 46 define a selected state of collection chamber 34 which can increase or decrease the incoming wind speed. A controller 194 using the information of the selected states of window openings 46 (or the selected state of collection chamber 34) transmitted from minimizing means 184 along a line 190 and the wind direction at an input 192 generates control commands which are sent along a line 196 to motors 100 driving windows 50. The control commands change the position of windows 50 to correspond to the selected state of collection chamber 34. The position of windows 50 define a field of wind speeds at inlet opening 54 of acceleration chamber 36. Wind speed sensors 198 (not shown in FIGS. 1 and 2) positioned at inlet opening 54 measure the field of wind speeds which are sent along a line 200 to an average calculator 202. Calculator 202 determines the actual average value of the wind speeds. The actual average wind speed is sent along a line 174 to identifying means 160 and fed back along line 180 as described before. The operation of subsystem of automatic control 151 for maintaining a steady regime is the same as described for maintaining a limiting regime, because the steady regime is a special case of the limiting regime when the difference between the speed limit and the actual average wind speed is about zero.

In complete operation of wind power plant 30, wind sensor set 72 detects the wind direction and measures the wind speed constantly and transmits the observed data to control unit 74. Processing the received data on the wind direction and speed control unit 74 selects states for turbine chambers 40 and window openings 46 to optimize energy production of wind power plant 30 and maintain the regular regimes of operation of wind driven turbines 58 as explained in the aforesaid description of the control unit. At each moment a certain number of turbine chambers 40 defined by the selected structural state of wind power plant 30 are opened and a certain number of window openings 46 facing into the wind defined by the selected state of collection chamber 34 are opened. The wind entering the opened window openings 46 of collection chamber 34 passes through acceleration chamber 36 which accelerates the wind. Further the accelerated air flow parts from acceleration chamber 36 entering the parting passages 38 connected with the opened turbine chambers 40 of the selected structural state. The parting air flows impinge upon the blades of the turbines 58 at throats 60 of the opened turbine chambers 40 to affect rotation of the turbines and associated turbine shafts 128. With mechanical transmission means 66 turbine shafts 128 transmit rotation to gear boxes 70 which are adapted to operate electric generators 68. There are two distinguished extreme situations when the maximum accelerated wind speed of wind power plant 30 is lower than the speed limit of any turbine 58 and when all turbine chambers 40 are opened and all turbines 58 operate at their speed limits. In the first situation the selected structural state of wind power plant 30 includes only one turbine chamber 40 with the maximum acceleration coefficient of acceleration chamber 36. In the second situation control unit 74 modulates the sum of the wind capture areas of the window openings 46 facing into the wind by selecting them so that all turbines 58 are maintained at their speed limits at any high current natural wind speed. For more clear understanding the operation of wind power plant 30 it is best to consider a simple example shown hereinbelow.

Suppose wind power plant 30 comprises five identical wind turbine chambers 40 with identical turbines 58 as shown in FIG. 1 and the optimal criteria of energy production are the maximum energy production and the maximum sensitivity to the incoming wind speed. Suppose also the nominal wind speed of each turbine 58 is 60 m/s (meters per second) which is accepted as the speed limit for each turbine chamber 40 and the maximum acceleration coefficient of collection chamber 34 is 1, i.e. the acceleration coefficient of collection chamber 34 takes a value in the interval from 0 to 1. Suppose further the wind speed start up or cut-in wind speed of each wind turbine 58 is 4 m/s and the maximum acceleration coefficient of acceleration chamber 36 is 20. This means that the acceleration coefficient of acceleration chamber 36 takes the values 20, 10, 20/3, 5 or 4 corresponding to the selected structural states including one, two, three, four or five turbine chambers 40 being in open state respectively. Then the speed limit at inlet opening 54 takes the values 3 m/s, 6 m/s, 9 m/s, 12 m/s or 15 m/s corresponding to the selected structural states including one, two, three, four or five opened turbine chambers 40 respectively. Hereinbelow the operation of the wind power plant at all the intervals of the current natural wind speeds will be considered in turn. Since the formula of wind power is known for those skilled in the art, hereinbelow only the resulted calculated values corresponding to the maximum energy production will be presented.

If the current natural wind speed takes a value in the interval from 0 to 3 m/s wind power plant 30 is in the first extreme situation and the selected structural state of the wind power plant defined by optimizer 158 includes one opened turbine chamber 40, say, the central turbine chamber of wind power plant 30 shown in FIGS. 1 and 2. Since the speed limit is 3 m/s, minimizing means 184 selects open state for all the windwardly facing window openings 46 to get the minimum difference between the speed limit and the actual average wind speed at inlet opening 54. Apparently in this case the acceleration coefficient of collection chamber 34 is 1 and the acceleration coefficient of acceleration chamber 36 is 20. Since the wind start up is 4 m/s, the turbine positioned in the central turbine chamber begins to generate electricity when the current natural wind speed gets the value 0.2 m/s, which is the maximum sensitivity of wind power plant 30.

If the current natural wind speed takes a value in the interval from 3 m/s to 4.762 m/s, the selected structural state defined by optimizer 158 includes one opened turbine chamber, i.e. the central turbine chamber continues to be opened. However, minimizing means 184 selects open state only for some of the windwardly facing window openings 46 to maintain the difference between the speed limit and the actual average wind speed about the zero value. For example, if the current natural wind speed is 4 m/s minimizing means 184 selects open state for a certain number of windwardly facing window openings 46 so that the acceleration coefficient of collection chamber 34 is about 0.75.

If the current natural wind speed takes a value in the interval from 4.762 m/s to 6 m/s, the selected structural state defined by optimizer 158 includes two opened turbine chambers 40, say, the central turbine chamber and another wind turbine chamber 40 shown in FIGS. 1 and 2. Since the speed limit is 6 m/s, minimizing means 184 selects open state for all the windwardly facing window openings 46 to get the minimum difference between the speed limit and the actual average wind speed.

If the current natural wind speed takes a value in the interval from 6 m/s to 7.86 m/s, the selected structural state defined by optimizer 158 includes two opened turbine chambers 40 and minimizing means 184 selects open state only for a certain number of windwardly facing window openings 46 to maintain the difference between the speed limit and the actual average wind speed about zero.

If the current natural wind speed takes a value in the interval from 7.86 m/s to 9 m/s, the selected structural state defined by optimize 158 includes three opened turbine chambers 40 and minimizing means 184 selects open state for all the windwardly facing window openings 46.

If the current wind speed takes a value in the interval from 9 m/s to 10.9 m/s, the selected structural state defined by optimizer 158 includes three opened turbine chambers 40 and minimizing means 184 selects open state only for a certain number of windwardly facing window openings 46.

If the current natural wind speed takes a value in the interval from 10.9 m/s to 12 m/s, the selected structural state defined by optimizer 158 includes four opened turbine chambers 40 and minimizing means 184 decides to open all the windwardly facing window openings 46.

If the current natural wind speed takes a value in the interval from 12 m/s to 13.93 m/s, the selected structural state defined by optimizer 158 includes four opened turbine chambers 40 and minimizing means 184 selects open state only for a certain number of windwardly facing window openings 46.

If the current natural wind speed takes a value in the interval from 13.93 m/s to 15 m/s, the selected structural state defined by optimizer 158 includes five opened turbine chambers 40 and minimizing means 184 selects open state for all the windwardly facing window openings 46.

If the current natural wind speed takes any value greater than 15 m/s, the selected structural state defined by optimizer 158 includes all the five opened turbine chambers 40 and minimizing means 184 selects open state only for a certain number of windwardly facing window openings 46 to maintain the difference between the speed limit and the actual average wind speed at inlet opening 54 about zero. Whereby wind power plant 30 continues to produce the maximum power and all wind driven turbines 58 continue operating at their nominal wind speed 60 m/s in spite of any high current natural wind speed greater than 15 m/s. For example, in a storm the current natural wind speed gets 150 m/s, then minimizing means 184 selects open state for such a number of windwardly facing window openings 46 that the acceleration coefficient of collection chamber 34 is about 0.1 and all five wind driven turbines 58 continue operating at the nominal speed 60 m/s.

The control purpose described in the aforesaid operation of wind power plant 30 is to produce maximum power with the maximum sensitivity to the incoming wind speed in the condition of maintaining the limiting regime of operation of wind driven turbines 58. However, other control purposes also may be interesting. For example, an alternative control purpose of the aforesaid exemplary wind power plant 30 is to produce maximum power in the condition of maintaining the steady regime with nominal wind speed 60 m/s for all the wind driven turbines 58 except for the central turbine maintained in the limiting regime. For this purpose the selected structural state defined by optimizer 158 includes only the central turbine chamber in open state if the current natural wind speed takes a value less than 6 m/s. Further, the selected structural state includes two, three, four or five opened turbine chambers 40 if the current natural wind speed takes a value in the intervals from 6 m/s to 9 m/s, 9 m/s to 12 m/s, 12 ms to 15 m/s or from 15 m/s to any higher natural wind speed respectively.

Another exemplary control purpose of wind power plant 30 may be the maintenance of a limiting regime of operation of wind driven turbines 58 in the condition of absence of the closing-off means of turbine chambers 40, i.e. all the turbine chambers 40 are always opened. The purpose is extreme to remove the closing-off means of turbine chambers 40 and the subsystem of optimal control of control unit 74. With the control purpose control unit 74 selects open state for all the windwardly facing window openings to produce maximum power if the wind speed at inlet opening 54 is less than the speed limit.

The aforesaid illustrated exemplary wind power plant 30 comprises five identical turbine chambers 40. However, in practice wind power plant 30 may comprise any number of turbine chambers and wind driven turbines should not be identical and may have different nominal wind speeds in accordance with the present invention.

The structures of the elements of wind power plant 30 presented in FIGS. 1–11 may be replaced by other structures implementing the same functions.

FIG. 13 represents a rolling shutter adapted to be a controlled window for closing-off window opening 46 of collection chamber 34. In this figure the rolling shutter comprises a motor 204, a gearing 206, a roller 208 and metal sheets 210 connecting successively together due to a specific sectional configuration of the sheets. An exemplary sectional configuration of the sheet is shown in FIG. 14. The ends of metal sheets 210 slide along tracks 212 mounted on posts 48 of collection chamber 34. For this controlled window the roller system, comprising motor 204, gearing 206 and roller 208, may be adapted to be mounted on upper beam 84. The rolling shutters modulate the wind capture area of collection chamber 34 continuously, while controlled revolving windows 50 modulate the wind capture area instantly with discrete values. Whereby the combined use of the both types of the controlled windows allow to control the wind speed at inlet opening 54 of acceleration chamber 36 with a higher accuracy.

If wind power plant 30 is not very large, collection chamber 34 may comprise an unique controlled rotatable window generally designated by 214 in FIG. 15. In this figure rotatable window 214 comprises a cylindrical frame, generally designated by 216, and rollers 218. Cylindrical frame 216 is constructed of vertical metal rods 220 and horizontal metal rings 222. Rods 220 and rings 222 are secured together at their crossing points by welds or otherwise to form cylindrical frame 216. A part of the periphery of cylindrical frame 216 is covered by sheet materials or boards to form collection chamber 34. A schematic representation of a relative position of the wind direction to collection chamber 34 with rotatable window 214 is shown in FIG. 16. In this figure a thick solid arc, designated by 224, represents a closed part of the periphery of collection chamber 34 covered by sheet materials, and a dot arc, designated by 226, represents an open part of the periphery of collection chamber 34. A line 228, distinguishing the two parts 224 and 226, represents the end plane of the inlet opening of collection chamber 34. In FIG. 15 rollers 218 slide along a guide channel 230 secured to platform 52 mounted on the top of tower 42. The upper ring 222 of frame 216 is secured to the outer ends of spokes 232 of a controlled flywheel 234 mounted for rotation on roof 44. A control motor 236 with an adapted gearing (not shown) rotates flywheel 234 receiving control signals from control unit 74. Control unit 74 modulates the wind capture area of the inlet opening of collection chamber 34 with rotatable window 214 by regulating the angle, designated by α, between the current wind direction, designated by 238, and plane 228 (see FIG. 16).

Flywheel 234 may be also driven by a vane 240 (see FIG. 17) which may be mounted on the flywheel by struts (not shown). For wind power plant 30 with controlled rotatable window 214 driven by vane 240, which is always parallel with the prevailing wind direction, the modulation of wind speed in turbine chambers 40 may be realized by regulated exhaust-openings (not shown) directing partially the accelerated wind out of acceleration chamber 36 directly to the outer space.

In FIG. 11 controlled sliding doors 138 used for closing-off turbine chambers 40 are mounted under the bottom surface 140 of turbine platform 62. However, other shutters may be also adapted to be mounted before wind driven turbines 58 with suitable forms of parting passages 38 and additional slots for mounting the shutters.

Acceleration chamber 36 illustrated in FIG. 1 has a frusto-conical shape. However, in accordance with this invention the acceleration chamber may be constructed of sections and segments of any forms which are facilitated for construction and assembly provided they form a converging air duct having a required acceleration coefficient.

Turbine chambers 40 of wind power plant 30 illustrated in FIG. 1 have a Venturi-shaped configuration. However, in accordance with this invention they may have alternative configurations which depend on the type of wind driven turbines used in wind power plant 30.

In wind power plant 30 illustrated in FIG. 1 the direction of air flows in acceleration chamber 36 is downward. However, in some situations the upward direction of air flows in the acceleration chamber is desirable. In these circumstances the acceleration system in FIG. 1 must be turned upside down, i.e. collection chamber 34 is positioned on the ground, acceleration chamber 36 is a vertical stationary converging upward air duct and mounted above the collection chamber, and consequently turbine chambers 40 are mounted above acceleration chamber 36. Wind power plants having an integrated acceleration system with the upward direction of air flows are possible in the scope of the present invention.

Figure 18:
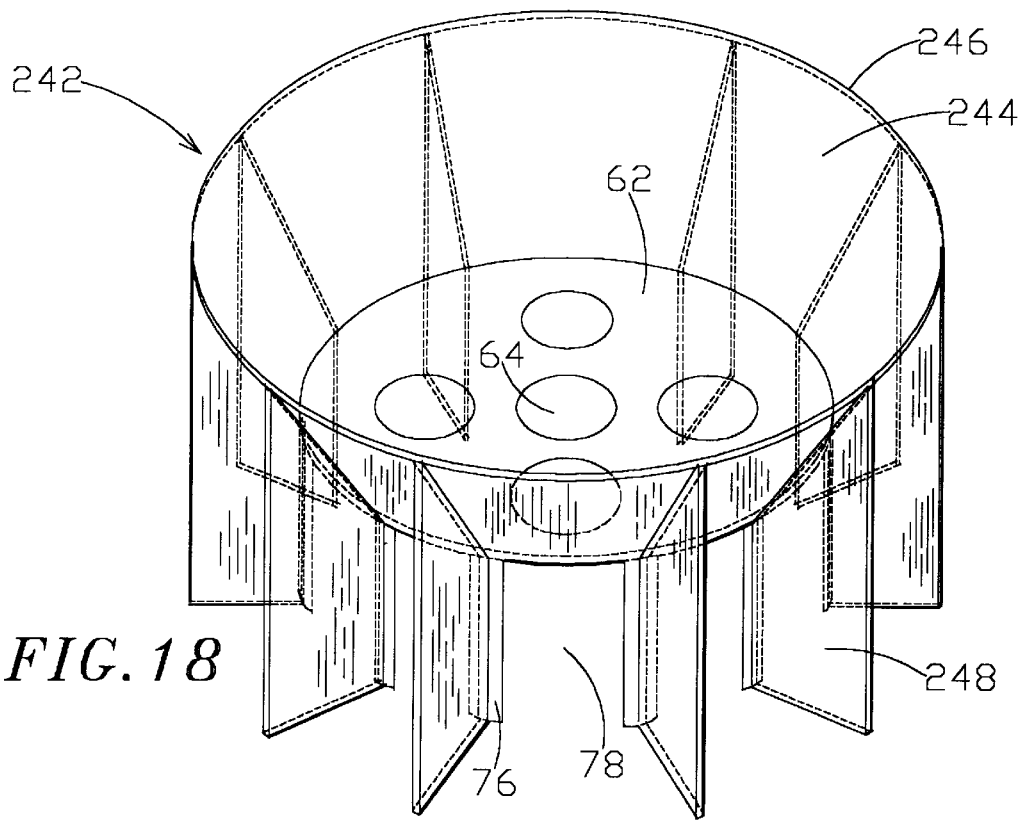
FIG. 18 is a schematic perspective view of a sucking means shown together with the bottom of the wind power plant of FIG. 1.
Figure 19:
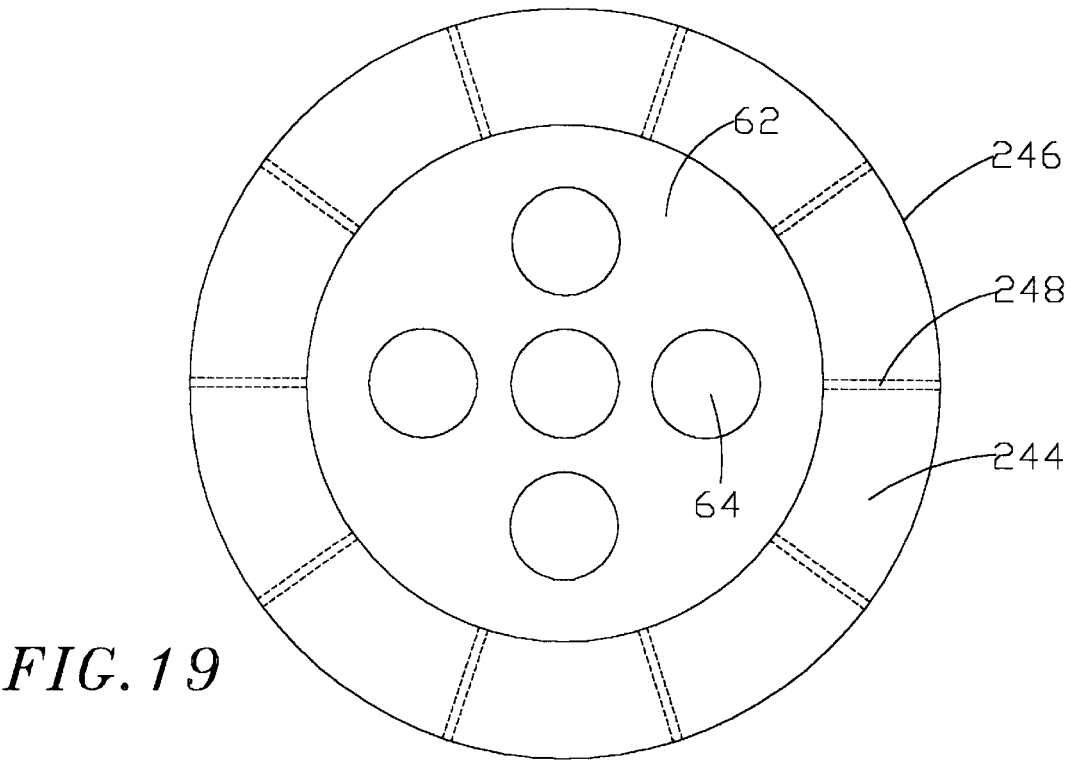
FIG. 19 is a top plan view of the structure shown in FIG. 18.

The air flow coming out of outlet openings 64 of turbine chambers 40 may create a turbulence in exhaust-space 78 at the bottom of wind power plant 30. A sucking means, generally designated by 242 in FIG. 18, may be used for fast releasing the turbulence. Sucking means 242 comprises an annular roof 244 sloping from an outer periphery 246 of the roof to the periphery of turbine platform 62 and rectangular walls 248 extending inwardly from outer periphery 246 to the periphery of exhaust-space 78 created by piers 76 and platform 62. Walls 248 are arranged equally around the periphery of tower 42 (see also FIG. 19). Apparently sucking means 242 creates converging passages for the natural wind. The accelerated wind passing through the passages releases the turbulence out of exhaust-space 78. The use of the sucking means can improve the operation of the wind power plant, but it is not imperative.

Figure 20:
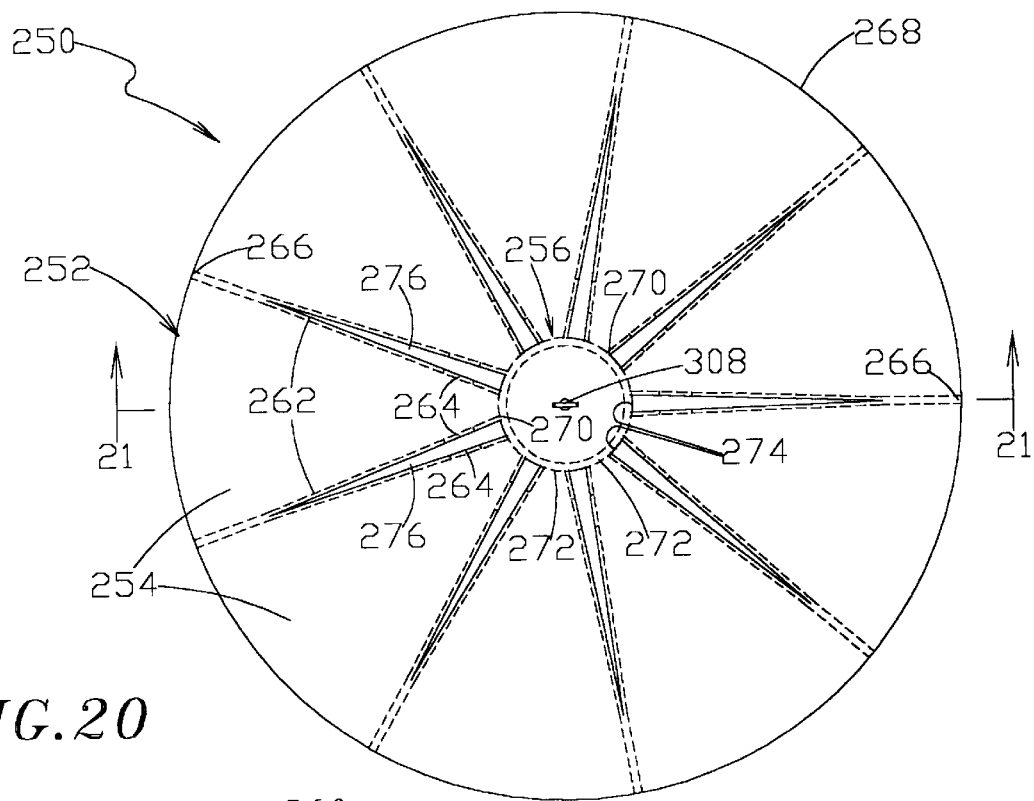
FIG. 20 is a schematic top plan view of a wind power plant constructed in accordance with an alternative embodiment of the invention.
Figure 21:
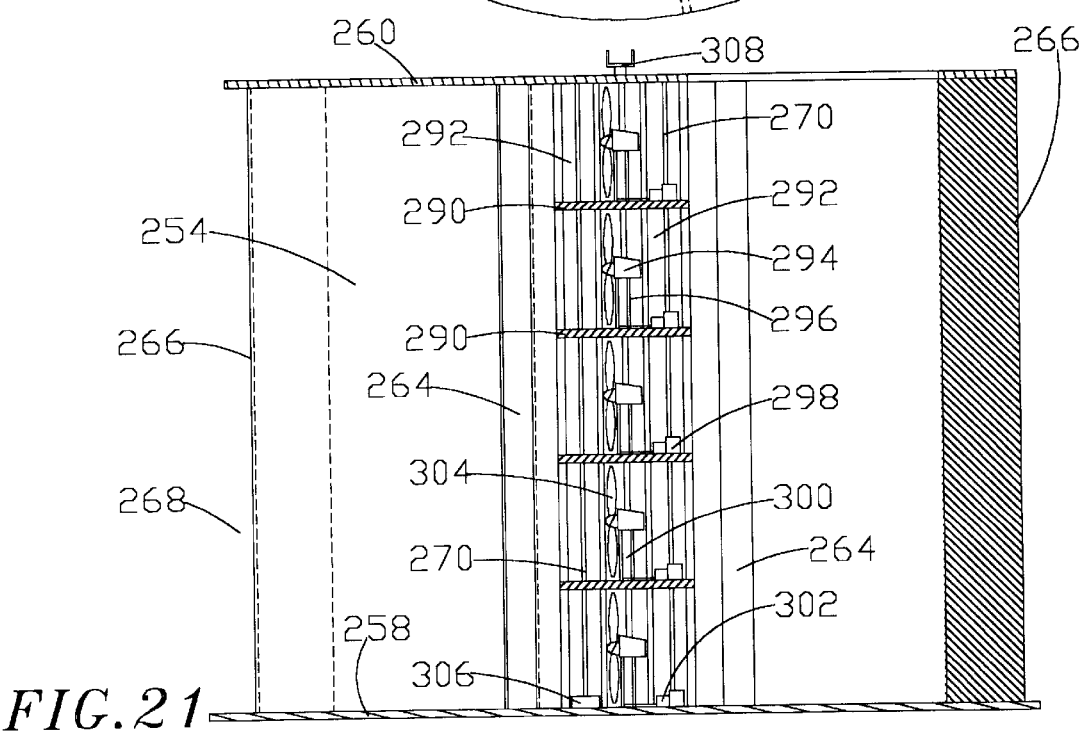
FIG. 21 is a sectional view of the structure of FIG. 20 taken on line 21—21 of FIG. 20.
Figure 22:
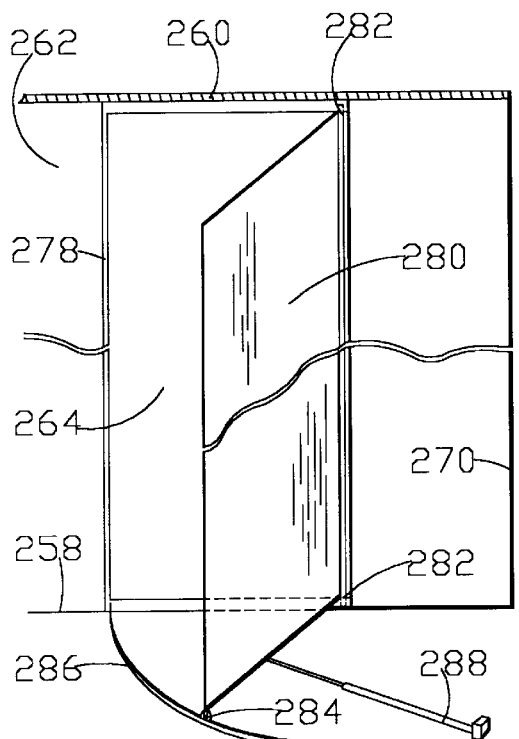
FIG. 22 is a schematic perspective view, partially broken away, of a structure of an controlled exhaust-door of an acceleration passage of the wind power plant of FIG. 20.

FIG. 20 illustrates a wind power plant, indicated generally at 250, constructed in accordance with an alternative embodiment of the present invention. FIG. 21 is a sectional view of wind power plant 250 taken on line 21—21 in FIG. 20. Wind power plant 250 includes a horizontal stationary integrated acceleration system, which comprises an accelerating wind means, indicated generally at 252, and a central multistory turbine house, indicated generally at 256. Accelerating wind means 252 includes a circular assembly of similar segmental acceleration passages 254 each of which comprises a base 258, a roof 260, rectangular side walls 262 and regulated exhaust-openings 264. Acceleration passages 254 may be built of conventional building materials. Outer vertical edges 266 of side walls 262 define vertical inlet openings 268 of acceleration passages 254. Inlet openings 268 create a complete periphery of accelerating wind means 252. Inner vertical edges 270 of side walls 262 of each acceleration passage 254 define an integrated inlet opening 272 of central multistory turbine house 256. The nearest rectangular side walls 262 of any two contiguous acceleration passages 254 have a common outer vertical edge 266 and diverge from each other when the side walls extend inwardly towards central multistory turbine house 256. Thus two contiguous acceleration passages 254 have no common inner vertical edge and two nearest inner vertical edges 270 of two contiguous acceleration passages 254 define an integrated exhaust-opening 274 of central multistory turbine house 256. Accordingly the nearest side walls 262 of any two contiguous acceleration passages 254 form an exhaust-passage 276 for both regulated exhaust-openings 264 of the contiguous acceleration passages 254 and the integrated exhaust-opening 274 of central multistory turbine house 256. Integrated inlet openings 272 and integrated exhaust-openings 274 of central multistory turbine house 256 form the complete periphery of multistory turbine house 256. The number of integrated inlet openings 272 equals to the number of integrated exhaust-openings 274 and it is desirable to construct accelerating wind means 252 so that each integrated inlet opening 272 faces to one of integrated exhaust-openings 274 as shown in FIG. 20, although it is not absolutely necessary. For example, in FIG. 20 wind power plant 250 includes nine pairs of acceleration passage 254 and exhaust passage 276 of accelerating wind means 252 and nine pairs of integrated inlet opening 272 and integrated exhaust-opening 274 of central multistory turbine house 256. Each regulated exhaust-opening 264 of acceleration passage 254 has a frame 278 (see FIG. 22) secured to base 258, roof 260 and side wall 262 and may be regulated by revolving or hinged exhaust-doors. An exemplary structure of an exhaust-door 280 is shown in FIG. 22. Exhaust-door 280 opens inwards and is supported for revolving around an vertical shaft 282 arranged in lateral side of frame 278 closer to integrated inlet opening 272 of central multistory turbine house 256. Suitable sleeve bearings (not shown) may be provided in the bores of shaft 282. Exhaust-door 280 has a roller 284 at the bottom. Roller 284 slides along a arc guide channel 286 secured on base 258. Exhaust-door 280 may be made of sheet metal, composite or any suitable materials. An additional arc guide channel may be constructed for guiding exhaust-door 280 at the top of the door (not shown). Exhaust-door 280 is driven by a hydraulic piston 288 or some hydraulic pistons (not shown). Exhaust-door 280 may be also driven by an electric motor with an adapted mechanical transmission means. The width of regulated exhaust-opening 264 must be sufficiently large so that the vertical outer ends of exhaust-doors 280 of two side walls 262 of each acceleration passage 254 can contact each other when the acceleration passage must be closed. Regulated exhaust-opening 264 may be divided into smaller openings at different altitudes each of which is regulated by a controlled window in accordance with the method of division of a controllable opening into window openings as described before.

Central multistory turbine house 256 has a plurality of floors 290 (see FIG. 21) forming stories which are turbine chambers 292 of wind power plant 250. For example, wind power plant 250 presented in FIGS. 20 and 21 has a central five-storied turbine house. Each turbine chamber 292 has closable inlet openings corresponding to integrated inlet openings 272 and closable exhaust-openings corresponding to integrated exhaust-openings 274 of central multistory turbine house 256. The closable inlet openings and exhaust-openings of each turbine chamber 292 corresponding to integrated inlet openings 272 and integrated exhaust-openings 274 respectively may be also closed-off by controlled windows (not shown) which are similar to the controlled windows of collection chamber 34 of wind power plant 30 constructed in accordance with the first embodiment of the present invention. For example, the structures of windows shown in FIGS. 3–7 are applicable to the controlled windows of turbine chambers 292 with mounting platforms secured directly on floors 290. Also the structure of the rolling shutter shown in FIG. 13 may be applicable directly to the controlled windows of turbine chambers 292.

Wind driven turbines 294, positioned in turbine chambers 292, may be of different conventional structures. For example, in FIG. 21 each turbine 294, having a horizontal axis, is supported for rotation on the top of a vertical support 296. Mechanical energy of each turbine 294 is translated to an electric generator 298 by a mechanical transmission means 300 and an adapted gear box 302. Each wind driven turbine 294 has an impeller 304 reoriented to the predominant wind direction by a servo-motor or by a guide vane (not shown). Generator 298 and gear box 302 are preferable to be positioned on floor 290 as shown in FIG. 21. However, generator 298 and gear box 302 may be also mounted on a platform (not shown) supporting turbine 294. A control unit 306 is provided for controlling the operation of wind power plant 250 and may be positioned on floor 290 of one of turbine chambers 292 as shown in FIG. 21 or in any other suitable place. Control unit 306 also may include a plurality of elements dispersed in different places. A wind sensor set 308 may be positioned on roof 260 of wind power plant 250. However, in snowy areas wind sensor set 308 must be placed in a suitable place to avoid snow cover and some means may be provided for protecting exhaust-passages 276 from snow cover. Wind speed sensors (not shown) may be also positioned in turbine chambers 292 and acceleration passages 254 to provide control unit 306 with the information of accelerated wind speeds.

Figure 23:
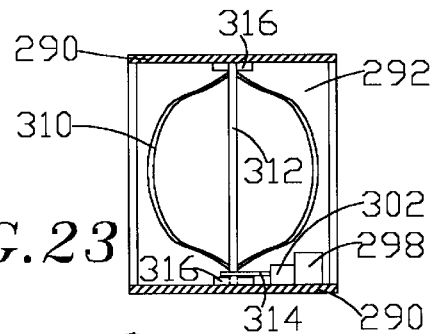
FIG. 23 is a schematic view of a turbine chamber of the wind power plant of FIG. 20 with a vertical-axis Darrieurs turbine.

Vertical-axis Darrieus turbines may be timely used in wind power plant 250. An exemplary Darrieus turbine installed in turbine chamber 292 is illustrated in FIG. 23. The Darrieus turbine comprises blades 310, a vertical shaft 312, and a mechanical transmission means 314 mounted on floor 290. Shaft 312 is mounted for rotation at the ends on supporters 316 secured on floor 290 and the ceiling of chamber 292.

Segmental acceleration passage 254 shown in FIGS. 20 and 21 has horizontal base 258 and horizontal roof 260. This construction is very simple and the acceleration coefficient of accelerating wind means 252 can be chosen broadly by selecting the distance between inner vertical edges 270 of each segmental acceleration passage 254. However, in some specific terrain the base and the roof may be constructed with desirable slopes. The slopes may be inward or outward. Choosing the slopes depends on the geographic features of the place of construction of the wind power plant 250 and required acceleration coefficients of accelerating wind means 252. Each segmental acceleration passage 254 shown in FIGS. 20 and 21 has two regulated exhaust-openings 264 located at two side walls 262 thereof. However, each segmental acceleration passage 254 may have a single exhaust-opening located at one side wall 262 thereof. In this cause the width of the single exhaust-opening must be sufficiently large so that the corresponding exhaust-door of the exhaust-opening can close the acceleration passage.

Control unit 306 is provided for controlling the process of selective closing-off turbine chambers 292 and regulating the position of exhaust-doors 280 to satisfy desirable (optimal) criteria of energy production in the condition of maintaining regular regimes of operation of wind driven turbines 294. The meanings of the optimal criteria and regular regimes for control unit 306 of wind power plant 250 are the same as described for control unit 74 of wind power plant 30.

Figure 24:
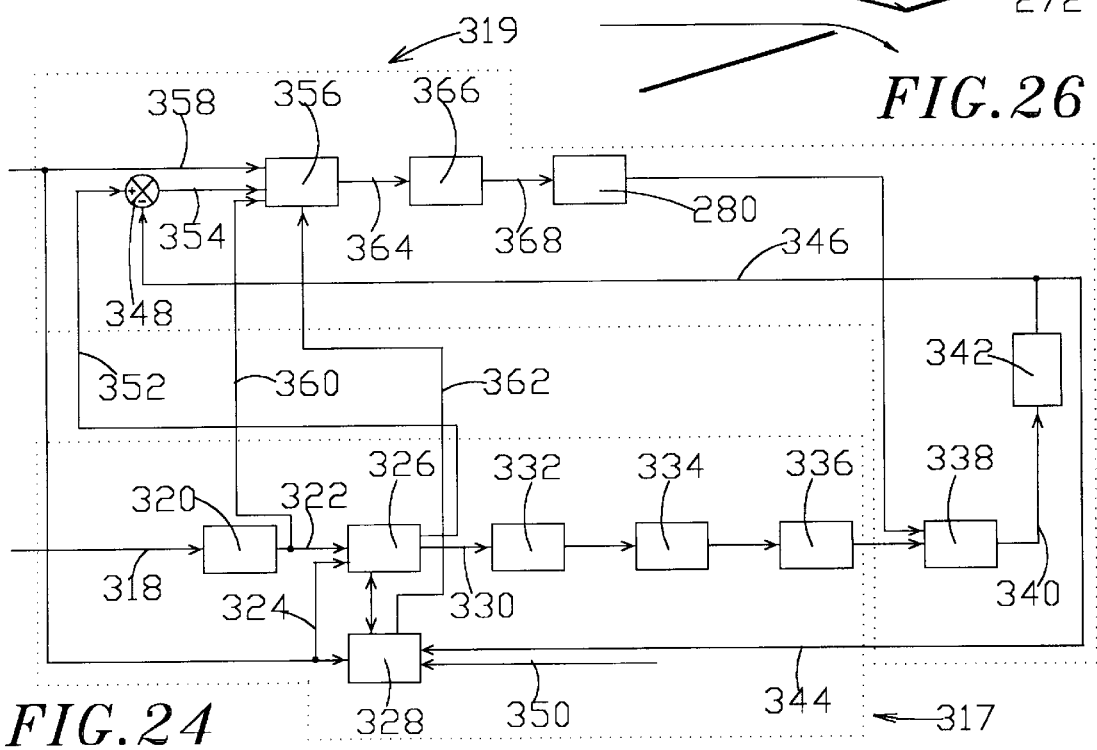
FIG. 24 illustrates a simplified diagram of a control system of the wind power plant of FIG. 20.

Control unit 306 is connected with the sensors and control motors of wind power plant 250 by electrical lead wires (not shown) or radio waves. FIG. 24 illustrates a simplified diagrammatic representation of an exemplary control system defining the work of control unit 306. The control system may be divided into a subsystem of optimal control, bounded by a closed dot line and indicated generally at 317, and a subsystem of automatic control, bounded by a closed dot line and indicated generally at 319. The function of subsystem of optimal control 317 is the selection of states (open or closed) for turbine chambers 292 to optimize energy production in accordance with the desirable criteria. The function of subsystem of automatic control 319 is the maintenance of the regular regimes of operation of wind driven turbines 294 positioned in the opened turbine chambers 292.

In operation, wind power plant 250 is governed by control unit 306.

Consider now subsystem of optimal control 317. The current wind direction is sent along a line 318 to a calculator 320 at which the current wind capture areas of inlet openings 268 facing into the wind are defined. The current wind capture area of each windwardly facing inlet opening 268 is equal to its area multiplied by cosine of the angle between the wind direction and the perpendicular of the plane of the inlet opening. The current wind capture area of each downwind facing inlet opening 368 is equal to zero. An identifying means 328 identifies the acceleration coefficients of accelerating wind means 252 at different speeds with taking air viscosity into account by a statistical method or an adapted method. An optimizer 326 receiving the acceleration coefficients in communication with identifying means 328, the information of the current wind capture areas sent along a line 322 and the current wind speed sent along a line 324 selects states (open or closed) for turbine chambers 292 to optimize energy production. The selected states of turbine chambers 292 define a selected structural state of wind power plant 250. A controller 332 receiving the information of the selected states of turbine chambers 292 translated along a line 330 generates control commands which are sent to motors 334 (not shown in FIGS. 20 and 21) driving windows 336 (not shown in FIGS. 20 and 21) of turbine chambers 292. The position of the windows affects the current accelerated wind speeds in the turbine chambers. Wind speed sensors 338 positioned in turbine chambers 292 (not shown in FIGS. 20 and 21) measure the accelerated wind speeds in the turbine chambers and transmit the information of the current accelerated wind speeds along a line 340 to an average calculator 342. The average value of wind speeds of the opened turbine chambers is sent along a line 344 to identifying means 328. The identifying means receives the information of wind direction, natural wind speed and wind capture areas in communication with optimizer 326. Accelerated wind speeds measured by wind speed sensors (not shown) positioned at cross-sections of acceleration passages 254 are sent to identifying means 328 along a line 350. If the air viscosity is neglected, identifying means 328 and all the wind speed sensors in turbine chambers 292 and acceleration passages 254 may be removed, and the acceleration coefficients are predetermined by the relations of respective areas.

Subsystem of automatic control 319 maintains a limiting regime (or a steady regime) of operation of wind driven turbines 294. The actual average value of wind speeds in the opened turbine chambers 292 is sent to a summing means 348 along a line 346. The difference between a wind speed limit, determined by the selected structural state, at an input side 352 of summing means 348 and the actual average wind speed is resulted at an output side 354 of summing means 348 and translated to a minimizing means 356. Minimizing means 356 using the information of the current natural wind speed at an input 358, the wind capture areas of inlet openings 268 translated from calculator 320 along a line 360 and the acceleration coefficients transmitted from identifying means 328 along a line 362 defines the opened angles between exhaust-doors 380 and respective side walls 262 of regulated exhaust-openings 264 to minimize the difference between the wind speed limit and the actual average wind speed in the opened turbine chambers 292. Controller 366 using the information of the opened angles transmitted from minimizing means 356 along a line 364 generates control commands which are sent along a line 368 to the motors (not shown in FIG. 22) of hydraulic pistons 288 driving exhaust-doors 280. The position of exhaust-doors 280 changes the wind speeds in the opened turbine chambers 292. The wind speeds are measured by sensors 338 and averaged at 342. The average value of the wind speeds is fed back along a line 346 to summing means 348 and sent along a line 344 to identifying means 328 as described before. The operation of subsystem of automatic control 319 for maintaining a steady regime is the same as described for maintaining a limiting regime.

Figure 25:
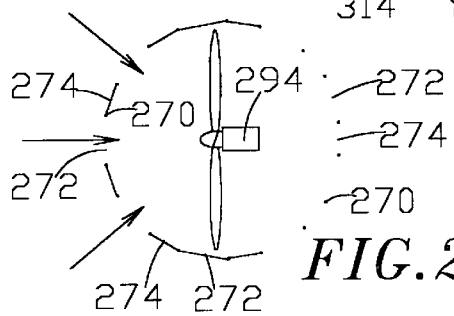
FIG. 25 illustrates schematically a position of controlled windows of an opened turbine chamber of the wind power plant of FIG. 20.
Figure 26:
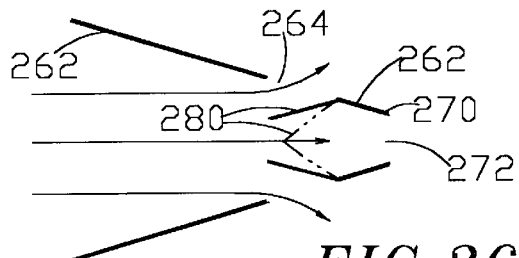
FIG. 26 is a diagrammatic view of a relative position of the controlled exhaust-doors of an acceleration passage of the wind power plant of FIG. 20.

In complete operation of wind power plant 250, wind sensor set 308 detects the wind direction and measures the wind speed constantly and transmits the observed data to control unit 306. Processing the received data on the wind direction and speed control unit 306 selects states for turbine chambers 292 and regulates the position of exhaust-doors 280 to optimize energy production and maintain the regular regimes of operation of wind driven turbines 294 as explained in the aforesaid description of the control unit. At each moment a certain number of turbine chambers 292 defined by the selected structural state of wind power plant 250 are opened and exhaust-doors 280 situate at angles relative to the respective side walls 262 such that the difference between the wind speed limit and the actual average wind speed of the opened turbine chambers 292 gets minimum. The position of the windows of each opened turbine chamber 292 is schematically illustrated in FIG. 25. In this figure the arrows show the air flows in windwardly facing integrated inlet openings 272, the solid lines show the windows being in closed position and the blanks between two successive points show the windows being in open position. Thus in this figure all the controlled windows corresponding to the windwardly facing integrated inlet openings 272 are opened and all the downwind facing windows of the opened turbine chambers 292 are also opened to create a maximum outlet opening for the opened turbine chamber 292 and improve the aerodynamic regime for the positioned in it wind driven turbine 294. The accelerated wind entering the opened turbine chambers 292 impinge upon the blades of turbines 294 to affect rotation of the turbines which is transmitted to operate generator 298 by mechanical transmission means 300 and adapted gear box 302. FIG. 26 illustrates schematically a relative position of exhaust-doors 280 for explanation of modulating the acceleration coefficients of acceleration passage 254. When exhaust-doors 280 close exhaust-openings 264 of acceleration passage 254 the acceleration coefficient of the acceleration passage is maximum. When the vertical outer ends of exhaust-doors 280 contact each other as shown by phantom lines in FIG. 26 the acceleration coefficient of acceleration passage 254 is zero. When exhaust-doors 280 are in a position between the aforesaid extreme positions as shown by solid lines in FIG. 26 a part of the accelerated wind enters central multistory turbine house 256 and the other part exhausts out of two lateral exhaust-openings 264. In this figure the arrow in the middle shows the air flow entering the central multistory turbine house, and the two lateral arrows show the air flows exhausting through the two respective lateral regulated exhaust-openings 264. Accordingly, modulating the position of exhaust-doors 280 maintains the regular regime of operation of wind power plant 250. There are two distinguished extreme situations when the maximum accelerated wind speed of wind power plant 250 is lower than the predetermined wind speed limit of any turbine 294 and when all the turbine chambers 292 are opened and all turbines 294 operate at their wind speed limits. In the first situation the selected structural state of wind power plant 250 includes only one turbine chamber 292 with the maximum acceleration coefficient. In the second situation control unit 306 modulates the angles of exhaust-doors 280 relative to the respective side walls 262 to maintain the regular regimes of operation of all turbines 294 at any high current natural wind speed.

Since exhaust-doors 280 are used for dividing the mass of incoming accelerated wind into the exhaust part and the entering part, any other door systems or window systems dividing the mass of incoming accelerated wind into the two parts may be also used as exhaust-doors (or exhaust-windows) in accordance with the present invention. In wind power plant 250 regulated exhaust-openings 264 are constructed at side walls 262 of acceleration passages 254. However, the regulated exhaust-openings may be constructed in any other suitable places, for example, on the roof of acceleration passages 254.

Figure 27:
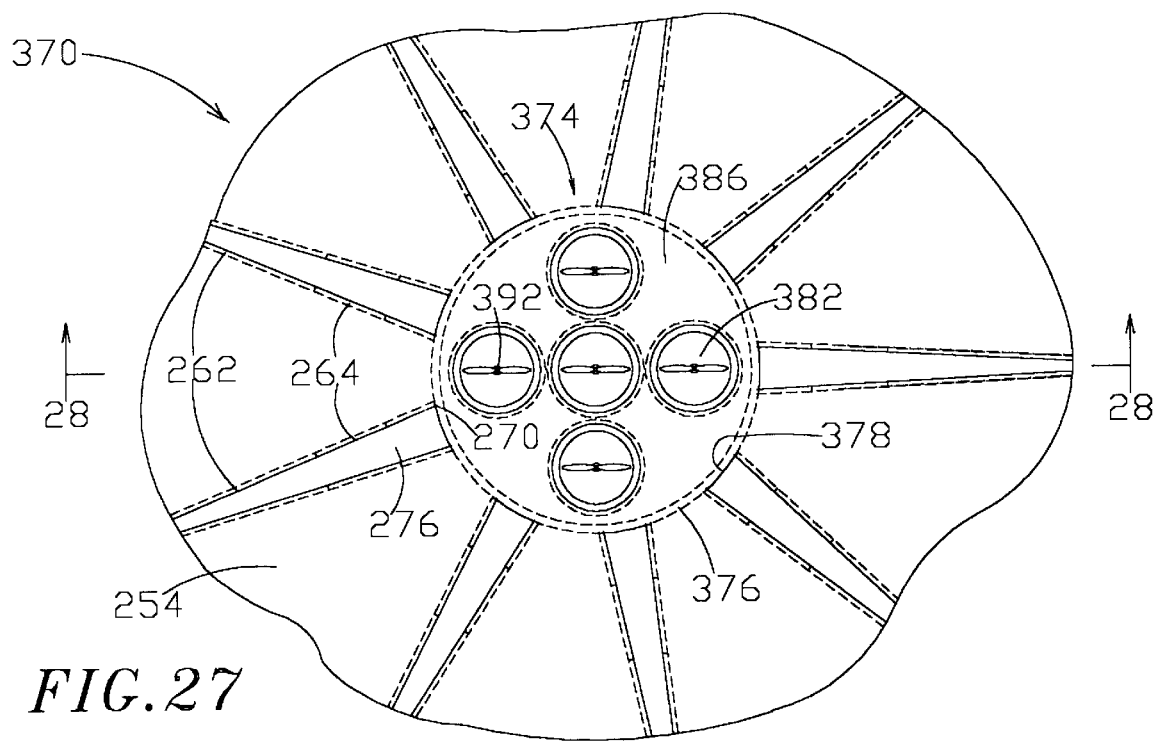
FIG. 27 is a fragmentary schematic top plan view illustrating a modification of the wind power plant of FIG. 20.
Figure 28:
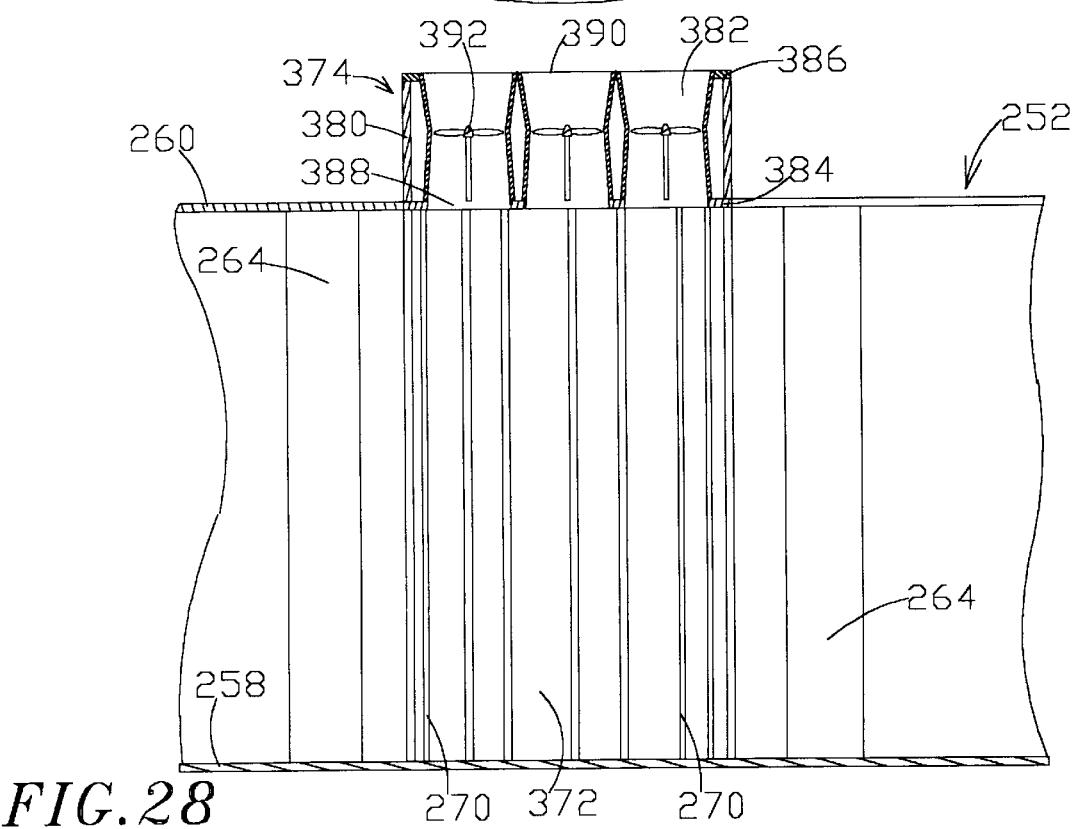
FIG. 28 is a fragmentary sectional view of the structure of FIG. 27 taken on line 28—28 of FIG. 27.

FIGS. 27 and 28 illustrate a wind power plant, indicated generally at 370, which is a modification of wind power plant 250 and may be also considered as a combination of the two aforesaid preferred embodiments. Wind power plant 370 includes an accelerating wind means, which comprises a central collection chamber 372 and a circular assembly of segmental acceleration passages similar to segmental acceleration passages 254 of wind power plant 250, and a turbine story, indicated generally at 374. In FIGS. 27 and 28 the reference numerals repeating the numerals of FIGS. 20 and 21 show the elements of wind power plant 370, which are similar to the elements of wind power plant 250. Central collection chamber 372 is a single room and positioned in the same place relative to the segmental acceleration passages as central multistory house 256 is. Inner vertical edges 270 of side walls 262 of each acceleration passage 254 define a closable inlet opening 376 of central collection chamber 372. Two nearest inner vertical edges 270 of two contiguous acceleration passages 254 define a wall 378 of central collection chamber 372. Inlet openings 376 are selectively close-off by controlled windows (not shown) which are similar to the controlled windows applicable to collection chamber 34 of wind power plant 30. Turbine story 374 is positioned on the top of central collection chamber 372. Turbine story 374 comprises a circular wall 380, a plurality of turbine chambers 382, a floor 384, and a roof 386. The structure of each turbine chamber 382 is similar to the structure of turbine chamber 40 of wind power plant 30 (see FIGS. 1, 2 and 10). Each turbine chamber 382 has an inlet opening 388, which is an exhaust-opening of central collection chamber 372, and a closable outlet opening 390 on roof 386. Outlet openings 390 are selectively closed-off by controlled sliding doors (not shown) which are located on roof 386 and similar to controlled sliding doors 138 applicable to turbine chambers 40 of wind power plant 30. Wind driven turbines 392 mounted in turbine chambers 382, respective mechanical transmission means and electric generators (not shown), positioned in turbine story 374, are similar to those applicable to wind power plant 30, for example see FIG. 10. Wind power plant 370 also comprises a control unit, a wind sensor set and other wind speed sensors (not shown) as described for wind power plant 250. The difference in operation between wind power plant 250 and 370 is that all the downwind facing closable inlet openings 272 of central multistory turbine house of wind power plant 250 are opened, while all the downwind facing closable inlet openings 376 of central collection chamber 372 of wind power plant 370 are closed to direct the accelerated wind toward inlet openings 388 of turbine chambers 382 positioned on the top of central collection chamber 372. The main feature of wind power plant 370 differing from wind power plant 250 is that the modification allows to use conventional wind driven turbines with stationary vertical rotation axis in the turbine chambers.

The output of the wind power plants with an integrated acceleration system described above is electrical. However, the mechanical energy produced by the wind driven turbines of the wind power plants may be used for other purposes, for example, for the work of compressors or other mechanical operations.

From the foregoing, it will now be seen that the present invention provides a novel type of wind power plants which have an extremely high efficiency and a simple integrated acceleration system of any scale, maintain regular regimes of wind speeds for the rotors of wind driven turbines, and operate normally at any high prevailing natural wind speed. Accordingly, the disclosed wind power plants overcome the problems of the lower efficiency, massy bulk of rotors, massy bulk of rotatably supported accelerators, erratic regime of wind speeds for rotors and excessive wind speeds which are being faced by the prior art.

The foregoing description illustrates preferred embodiments of the invention. However, it will be apparent to those skilled in the art that the principles and concepts employed in such description may be employed in other embodiments without departing from the scope of the invention. Accordingly, the following claims are intended to protect the invention broadly, as well as in specific forms shown herein.

I claim:

1. A wind power plant comprising, in combination, a wind acceleration system having an accelerating wind means for acceleration of an incoming prevailing wind and a plurality of turbine chambers each of which being a closable outlet passage of said accelerating wind means and closed-off by a controlled closing-off means, a plurality of wind driven turbines each of which being mounted in one of said turbine chambers, a plurality of electric generators each of which being operatively connected to one of said wind driven turbines by a mechanical transmission means and a gearing to convert mechanical energy of said wind driven turbine into electrical energy, a wind direction sensor, a wind speed sensor, a control unit for controlling the operation of said wind power plant, said accelerating wind means including regulating means for modulating accelerated wind speeds in said acceleration system, said control unit processing the data received from said wind direction sensor and said wind speed sensor to selectively close-off said turbine chambers by controlling said closing-off means for satisfying desirable criteria of energy production and to modulate the accelerated wind speeds in said acceleration system by controlling said regulating means for maintaining regular regimes of operation of said wind driven turbines positioned in said turbine chambers which being opened.

2. The wind power plant of claim 1 wherein said acceleration system being a vertical acceleration system supported by a vertical tower, said accelerating wind means comprising a collection chamber, an acceleration chamber and a plurality of parting passages, said collection chamber being mounted on top of said tower and having an inlet opening and a stationary outlet opening facing downward, said regulating means simultaneously being a means orientating said inlet opening of said collection chamber towards the incoming prevailing wind, said acceleration chamber being a vertical stationary converging downward air duct connected with said collection chamber at said stationary outlet opening and accelerating the wind coming from said collection chamber, each of said parting passages connecting said acceleration chamber with one of said turbine chambers.

3. The wind power plant of claim 2 wherein said collection chamber comprising a roof and a plurality of closable window openings arranged in circular arrays extending circumferentially about the periphery of said collection chamber at different altitudes, said regulating means being controlled windows each of which closing-off one of said closable window openings, a part of said closable window openings facing into the wind being in open state defining a wind capture area of said inlet opening of said collection chamber while the remaining part of said closable window openings being in closed state to direct the incoming wind through said stationary outlet opening into said acceleration chamber, said control unit modulating the accelerated wind speeds in said acceleration system by controlling the position of said controlled windows to vary the wind capture area of said inlet opening.

4. The wind power plant of claim 3 wherein said acceleration chamber comprising a number of sections secured together, each of said turbine chambers comprising a number of sections secured together, each of said parting passages comprising a number of sections secured together, each of said sections comprising a number of segments secured together, said sections and said segments having seams for recuring.

5. The wind power plant of claim 3 wherein said controlled windows being controlled revolving windows each of which being fashioned from sheet material and secured on a turntable driven for rotation by a control motor with an adapted mechanical transmission means, said turntable and said control motor together with said adapted mechanical transmission means being muonted on an integral mounting platform constructed for each of said circular arrays of said closable windows openings.

6. The wind power plant of claim 3 wherein said controlled windows being adapted controlled rolling shutters each of which comprising metal sheets connecting successively together due to a specific configuration of said sheets and a roller driven for rotation by a control motor with an adapted gearing.

7. The wind power plant of claim 5 wherein a part of said controlled revolving windows being replaced with adapted controlled rolling shutters each of which comprising metal sheets connecting successively together due to a specific configuration of said sheets and a roller driven for rotation by a control motor with an adapted gearing.

8. The wind power plant of claim 2 wherein said collection chamber having a cylindrical shape with a vertical central axis and comprising a circular roof and a rotatable cylindrical frame positioned under said roof, said rotatable cylindrical frame having a rotation axis coinciding with said vertical central axis of said collection chamber, said rotatable cylindrical frame including a plurality of rollers mounted on the bottom thereof, said rollers sliding along a guide channel secured to a platform mounted on top of said tower, a part of the periphery of said rotatable cylindrical frame being covered by sheet materials to direct the incoming wind downward into said acceleration chamber, and the remaining part of the periphery of said rotatable cylindrical frame defining a plane of said inlet opening of said collection chamber, said regulating means being a controlled flywheel positioned on said roof and secured to said frame, said controlled flywheel being driven by a control motor with an adapted gearing and regulating the accelerated wind speeds in said acceleration system by adjusting the angle between the prevailing wind direction and said plane of said inlet opening of said collection chamber.

9. The wind power plant of claim 2 wherein said vertical tower having a cylindrical wall and piers at the bottom of said tower, said turbine chambers being Venturi-shaped and mounted on a platform constructed at the bottom of said tower and having outlet openings located at the bottom of said platform, said piers forming an exhaust-space for said turbine chambers, each of said turbine chambers having a Venturi throat, each of said wind driven turbines having an impeller located at said Venturi throat, said mechanical transmission means and said electric generators together with said control unit being positioned on said platform.

10. The wind power plant of claim 9 wherein said acceleration chamber having a frusto-conical configuration.

11. The wind power plant of claim 9 wherein said closing-off means being a controlled sliding door mounted under the bottom of said platform, said controlled sliding door being fashioned from sheet material and operatively supported in two side guide tracks, said controlled door being driven for sliding by a control motor with an adapted mechanical transmission means.

12. The wind power plant of claim 9 further including a sucking means comprising a circular assembly of similar segmental stationary acceleration passages arranged around the periphery of said exhaust-space for fast releasing air turbulence from said exhaust-space.

13. The wind power plant of claim 1 wherein said acceleration system being a vertical acceleration system supported by a vertical tower, said accelerating wind means comprising a collection chamber, an acceleration chamber and a plurality of parting passages, said collection chamber being mounted on a base of said tower and having an inlet opening and a stationary outlet opening facing upward, said regulating means simultaneously being a means orientating said inlet opening of said collection chamber towards the incoming prevailing wind, said acceleration chamber being a vertical stationary converging upward air duct connected with said collection chamber at said stationary outlet opening and accelerating the wind coming from said collection chamber, each of said parting passages connecting said acceleration chamber with one of said turbine chambers.

14. The wind power plant of claim 13 wherein said collection chamber comprising a plurality of closable window openings arranged in circular arrays extending circumferentially about the periphery of said collection chamber at different altitudes, and regulating means being controlled windows each of which closing-off one of said closable window openings, a part of said closable window openings facing into the wind being in open state defining a wind capture area of said inlet opening of said collection chamber while the remaining part of said closable window openings being in closed state to direct the incoming wind through said stationary outlet opening into said acceleration chamber, said control unit modulating the accelerated wind speeds in said acceleration system by controlling the position of said controlled windows to vary the wind capture area of said inlet opening.

15. The wind power plant of claim 1 wherein said accelerating wind means comprising a circular assembly of similar pairs of a stationary segmental acceleration passage and an exhaust-passage arranged around a cylindrical central multistory turbine house having a vertical central axis and a plurality of floors, each of said segmental acceleration passages including a base, a roof, rectangular side walls extending inwardly toward a wall of said central multistory turbine house and having outer vertical edges defining an inlet opening of said segmental acceleration passage and inner vertical edges defining an integrated inlet opening of said central multistory turbine house, the two nearest of said rectangular side walls of any two contiguous of said segmental acceleration passages having a common outer vertical edge and diverging from each other when said rectangular side walls extending inwardly toward said wall of said central multistory turbine house to form said exhaust-passage between said two contiguous of said segmental acceleration passages, the two nearest of said inner vertical edges of said rectangular side walls of any two contiguous of said segmental acceleration passages defining an integrated exhaust-opening of said central multistory turbine house, said floors forming stories of said central multistory turbine house and dividing each of said integrated inlet openings and each of said integrated exhaust-openings into closable inlet openings and closable exhaust-openings of said stories respectively, each of said stories forming one of said turbine chambers, said controlled closing-off means being controlled windows which closing-off said closable inlet openings and said closable exhaust-openings of said stories, when each of said turbine chambers being in open state said controlled windows corresponding to said closable inlet openings thereof and said closable exhaust-openings thereof facing downwind being opened while said closable exhaust-openings thereof facing into the wind being closed, each of said segmental acceleration passages having a system of regulated exhaust-openings, said regulating means modulating said regulated exhaust-openings to divide the accelerated wind in said segmental acceleration passage into two parts and directing one of said parts toward said central multistory turbine house and the other of said parts out of said segmental acceleration passage through said regulated exhaust-openings.

16. The wind power plant of claim 15 wherein said regulated exhaust-openings being located in segments of said rectangular side walls.

17. The wind power plant of claim 16 wherein said regulating means being controlled exhaust-doors, which being fashioned from sheet material and supported for revolving around a vertical shaft arranged in lateral side of said regulated exhaust-opening closer to said integrated inlet opening of said central multistory turbine house, said controlled exhaust-door being driven by a control motor with an adapted mechanical transmission means.

18. The wind power plant of claim 1 wherein said accelerating wind means comprising a cylindrical central collection chamber having a vertical axis and a circular assembly of similar pairs of a stationary segmental acceleration passage and an exhaust-passage arranged around said cylindrical central collection chamber, each of said segmental acceleration passages including a base, a roof, rectangular side walls extending inwardly toward a wall of said central collection chamber and having outer vertical edges defining an inlet opening of said segmental acceleration passage and inner vertical edges defining an integrated inlet opening of said central collection chamber, the two nearest of said rectangular side walls of any two contiguous of said segmental acceleration passages having a common outer vertical edge and diverging from each other when said rectangular side walls extending inwardly toward said wall of said central collection chamber to form said exhaust-passage between said two contiguous of said segmental acceleration passages, and central collection chamber comprising a plurality of arrays of closable window openings at different altitudes resulted from dividing said integrated inlet openings, said turbine chambers being vertical Venturi-shaped air ducts and positioned in a story constructed on a roof of said central collection chamber and having inlet openings which being holes on said roof of said central collection chamber, said story having a cylindrical wall and a roof for mounting sliding doors which being said controlled closing-off means of said turbine chambers, said closable window openings facing into the wind being opened while said closable window openings facing downwind being closed to direct the accelerated wind toward said inlet openings of said turbine chambers, said wind driven turbines having stationary vertical rotation axis, each of said segmental acceleration passages having a system of regulated exhaust-openings, and regulating means modulating said regulated exhaust-openings to divide the accelerated wind in said segmental acceleration passage into two parts and directing one of said parts toward said central collection chamber and the other of said parts out of said segmental acceleration passage through said regulated exhaust-openings.

19. A wind power plant comprising, in combination, a wind acceleration system having an accelerating wind means for acceleration of an incoming prevailing wind and a plurality of turbine chambers each of which being an outlet passage of said accelerating wind means, a plurality of wind driven turbines each of which being mounted in one of said turbine chambers, a plurality of electric generators each of which being operatively connected to one of said wind driven turbines by a mechanical transmission means and a gearing to convert mechanical energy of said wind driven turbine into electrical energy, a wind direction sensor, a wind speed sensor, a control unit for controlling the operation of said wind power plant, said accelerating wind means including regulating means for modulating accelerated wind speeds in said acceleration system, said control unit processing the data received from said wind direction sensor and said wind speed sensor to modulate the accelerated wind speeds in said acceleration system by controlling said regulating means for maintaining regular regimes of operation of said wind driven turbines.

20. A wind power plant comprising, in combination, a wind acceleration system having an accelerating wind means for acceleration of an incoming prevailing wind and a turbine chamber being an outlet passage of said accelerating wind means, a wind driven turbine being mounted in said turbine chamber, an electric generator being operatively connected to said wind driven turbine by a mechanical transmission means and a gearing to convert mechanical energy of said wind driven turbine into electrical energy, a wind direction sensor, a wind speed sensor, a control unit for controlling the operation of said wind power plant, said accelerating wind means including regulating means of modulating accelerated wind speeds in said acceleration system, said control unit processing the data received from said wind direction sensor and said wind speed sensor to modulate the accelerated wind speeds in said acceleration system by controlling said regulating means for maintaining a regular regime of operation of said wind driven turbine.

* * * * *